United States Patent
Kissell et al.

(10) Patent No.: US 7,424,599 B2
(45) Date of Patent: Sep. 9, 2008

(54) APPARATUS, METHOD, AND INSTRUCTION FOR SOFTWARE MANAGEMENT OF MULTIPLE COMPUTATIONAL CONTEXTS IN A MULTITHREADED MICROPROCESSOR

(75) Inventors: Kevin D Kissell, Le Bar sur Loup (FR); Darren M. Jones, Los Altos, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 546 days.

(21) Appl. No.: 10/929,097

(22) Filed: Aug. 27, 2004

(65) Prior Publication Data

US 2005/0240936 A1    Oct. 27, 2005

Related U.S. Application Data

(63) Continuation-in-part of application No. 10/684,350, filed on Oct. 10, 2003, now Pat. No. 7,376,954, which is a continuation-in-part of application No. 10/684,348, filed on Oct. 10, 2003.

(60) Provisional application No. 60/502,359, filed on Sep. 12, 2003, provisional application No. 60/502,358, filed on Sep. 12, 2003, provisional application No. 60/499,180, filed on Aug. 28, 2003.

(51) Int. Cl.
*G06F 9/312* (2006.01)
*G06F 9/46* (2006.01)

(52) U.S. Cl. .................................... 712/228
(58) Field of Classification Search ............... 712/228, 712/225
See application file for complete search history.

(56) References Cited

U.S. PATENT DOCUMENTS

| 4,817,051 | A | | 3/1989 | Chang |
| 4,860,190 | A | | 8/1989 | Kaneda et al. |
| 5,159,686 | A | | 10/1992 | Chastain et al. |
| 5,499,349 | A | | 3/1996 | Nikhil et al. |
| 5,511,192 | A | * | 4/1996 | Shirakihara .................. 718/106 |

(Continued)

FOREIGN PATENT DOCUMENTS

EP     0725334 A1    8/1996

(Continued)

OTHER PUBLICATIONS

Marr et al. Hyper-Threading Technology. Intel Technology Journal, Feb. 14, 2002, vol. 6, No. 1, Intel Corporation, USA.

(Continued)

*Primary Examiner*—Eric Coleman
(74) *Attorney, Agent, or Firm*—Sterne Kessler Goldstein Fox PLLC

(57) ABSTRACT

A multithreading microprocessor is disclosed. The microprocessor includes a plurality of thread contexts. The microprocessor provides instructions that enable a thread context issuing the instructions to move a value between itself and a target thread context distinct from the issuing thread context independent of cooperation from the target thread context. The instructions employ an operand to specify the target thread context. In one embodiment, the microprocessor is also a virtual multiprocessor including a plurality of virtual processing elements. Each virtual processing element includes a plurality of thread contexts. The instructions also employ a second operand to specify the target virtual processing element.

57 Claims, 24 Drawing Sheets

U.S. PATENT DOCUMENTS

| | | | |
|---|---|---|---|
| 5,515,538 | A | 5/1996 | Kleiman |
| 5,659,786 | A | 8/1997 | George et al. |
| 5,758,142 | A | 5/1998 | McFarling et al. |
| 5,812,811 | A | 9/1998 | Dubey et al. |
| 5,867,704 | A * | 2/1999 | Tanaka et al. ............... 718/105 |
| 5,892,934 | A | 4/1999 | Yard |
| 5,933,627 | A | 8/1999 | Parady |
| 5,944,816 | A | 8/1999 | Dutton et al. |
| 5,949,994 | A | 9/1999 | Dupree et al. |
| 5,961,584 | A | 10/1999 | Wolf |
| 6,061,710 | A | 5/2000 | Eickemeyer et al. |
| 6,088,787 | A * | 7/2000 | Predko ...................... 712/202 |
| 6,175,916 | B1 | 1/2001 | Ginsberg et al. |
| 6,189,093 | B1 | 2/2001 | Ekner et al. |
| 6,223,228 | B1 | 4/2001 | Ryan et al. |
| 6,330,656 | B1 | 12/2001 | Bealkowski et al. |
| 6,330,661 | B1 * | 12/2001 | Torii ........................ 712/228 |
| 6,401,155 | B1 | 6/2002 | Saville et al. |
| 6,591,379 | B1 | 7/2003 | LeVine et al. |
| 6,675,192 | B2 | 1/2004 | Emer et al. |
| 6,687,812 | B1 | 2/2004 | Shimada |
| 6,697,935 | B1 | 2/2004 | Borkenhagen et al. |
| 6,877,083 | B2 | 4/2005 | Arimilli et al. |
| 6,889,319 | B1 | 5/2005 | Rodgers et al. |
| 6,920,634 | B1 | 7/2005 | Tudor |
| 6,922,745 | B2 | 7/2005 | Kumar et al. |
| 6,971,103 | B2 | 11/2005 | Hokenek et al. |
| 6,986,140 | B2 | 1/2006 | Brenner et al. |
| 6,993,598 | B2 | 1/2006 | Pafumi et al. |
| 7,069,421 | B1 | 6/2006 | Yates, Jr. et al. |
| 7,127,561 | B2 | 10/2006 | Hill et al. |
| 7,134,124 | B2 * | 11/2006 | Ohsawa et al. .............. 718/100 |
| 7,185,185 | B2 * | 2/2007 | Joy et al. .................... 712/228 |
| 2002/0083278 | A1 | 6/2002 | Noyes |
| 2002/0103847 | A1 * | 8/2002 | Potash ........................ 709/107 |
| 2002/0147760 | A1 * | 10/2002 | Torii ........................ 709/107 |
| 2003/0014471 | A1 | 1/2003 | Ohsawa et al. |
| 2003/0074545 | A1 | 4/2003 | Uhler |
| 2003/0079094 | A1 | 4/2003 | Rajwar et al. |
| 2003/0115245 | A1 | 6/2003 | Fujisawa |
| 2003/0126416 | A1 | 7/2003 | Marr et al. |
| 2004/0015684 | A1 | 1/2004 | Peterson |
| 2007/0106887 | A1 | 5/2007 | Kissell |
| 2007/0106988 | A1 | 5/2007 | Kissell |
| 2007/0106989 | A1 | 5/2007 | Kissell |
| 2007/0106990 | A1 | 5/2007 | Kissell |

FOREIGN PATENT DOCUMENTS

| | | |
|---|---|---|
| EP | 0917057 A2 | 5/1999 |
| EP | 1089173 A2 | 4/2001 |
| WO | WO0153935 A1 | 7/2001 |

OTHER PUBLICATIONS

Engelschall, R.S., "pth GNU Portable Threads," Pth Manual, Online! Feb. 17, 2003, pp. 1-31, XP002315713.

Ishihara et al., "A Comparison of Concurrent Programming and Cooperative Multithreading," Euro-Par 2000 Parallel Processing. 6th International Euro-Par Conference. Proceedings (Lecture Notes in Computer Science vol. 1900) Springer-Verlag Berlin, Germany, Sep. 1, 2000, pp. 729-738, XP002315714, ISBN: 3-540-67956-1.

Frees, W., "Teilzeitarbeit Im Prozessor," Electronik, Franzis Verlag GMBH. Munche, DE, vol. 45, No. 9, Apr. 30, 1996, pp. 100-106, XP000595386, ISSN: 0013-5658 (English-language version of the search report or action which indicates the degree of relevance found by the foreign office is appended.).

Scheidhauer, Ralf, "Design, implementierung und Evaluierung einer virtuellen Maschine fur Oz," Online!, Dec. 1998, Dissertation, Saarbrucken, (English-language version of the search report or action which indicates the degree of relevance found by the foreign office is appended.).

Mehl et al., "An Abstract Machine for Oz," Research Report RR-95-08, Online!, Jun. 1995, pp. 1-23, Kaiserslautern Saarbrucken, ISSN 0946-008.

Unger et al., "Utilising Parallel Resources By Speculation," Parallel and Distributed Processing, 1999. PDP '99. Proceedings of the Seventh Euromicro Workshop on Funchal, Portugal Feb. 3-5, 1999, Los Alamitos, CA, USA, IEEE Computing Society, Feb. 3, 1999, pp. 339-343.

Tsai et al: "The Superthreaded Architecture: Thread Pipelining with Run-Time Data Dependence Checking and Control Speculation," Parallel Architectures and Compilation Techniques, 1996, Proceedings of the 1996 Conference in Boston, MA, USA, Oct. 20-23, 1996, Los Alamitos, CA, USA, IEEE Comput. Soc., Oct. 20, 1996, pp. 35-46.

Popov, Konstantin: "A Parallel Abstract Machine for the Thread-Based Concurrent Language Oz," Workshop on Parallism and Implementation of Technology for Constraint Logic Programming Languages, Sep. 1997, pp. 1-25.

Bolychevsky et al. "Dynamic Scheduling in RISC Architectures." IEEE Proceedings Computers and Digital Techniques, vol. 143, No. 5. Sep. 24, 1996. pp. 309-317.

The Ubicom IP3023™ Wireless Network Processor; "A Next Generation Packet Processor for Wireless Networking"; Apr. 15, 2003; UBICOM, 635 Clyde Ave. Mountain View, CA 94043.

Ungerer et al.; "A Survey of Processors with Explicit Multithreading"; ACM Computing Surveys, vol. 35, No. 1, Mar. 2003, pp. 29-63; Institute of Computer Science, University of Augsburg, Eichleitnerstrasse 30, D-86135 Augsburg, Germany.

David Fotland; A Multithreaded Wireless Network Processor with Software I/O, Embedded Processor Forum, Jun. 18, 2003; www.MDRonline.com.

Intel Technology Journal, vol. 8, issue 01, Feb. 14, 2002, ISSN 1535766X; Hyper-Threading Technology.

Carter et al., "Performance and Programming Experience on the Tera MTA", Tera Computer Corporation-SIAM Conference on Parallel Processing, Mar. 1999.

Alverson et al., "Tera Hardware-Software Cooperation," Tera Computer Corporation-Proceedings of the IEEE/ACM SC97 Conference, Nov. 15-21, 1997, San Jose, CA.

"Multithreaded Programming Guide", SUNSOFT- A Sun Microsystems, Inc, Business; 2550 Mountain View, CA 94043.

Kissell, Kevin D. "Microprocessor Forum (MPF) Conference Program Presentation: Architectural Extensions to the MIPS Architecture for High-Performance Embedded Systems." Oct. 15, 2003.

(webpage) Cray MTA-2 Historical Technical Papers, http://www.cray.com/products/programs/mta_2/resources.html. (Mar. 12, 2005), (formerly http://www.cray.com/products/systems/mta/psdocs.html (Jul. 2, 2004)).

Zaslavsky, Leonid et al. "A Scalable Approach for Solving Irregular Sparse Linear Systems on the Tera MTA Multithreaded Parallel Shared-Memory." Ninth SIAM Conference on Parallel Processing for Scientific Computing, San Antonio, TX. Mar. 1999.

Smith, Burton. "From Here to Petaflops." Keynote Address, Petaflops-systems Operations Working Review, (POWR), Bodega Bay, California, Jun. 1998.

Briggs, Preston. "Tuning the BLAS for the Tera." Workshop on Multithreaded Execution, Architecture and Compilation. (MTEAC 98), Jan. 1998.

Alverson, Gail et al., "Scheduling on the Tera MTA." IPPS '95 Workshop on Job Scheduling Strategies for Parallel Processing, Santa Barbara, CA, Apr. 1995, and in D.G.Feitelson and L. Rudolph, editors, Job Scheduling Strategies for Parallel Processing, Lecture Notes in Computer Science vol. 949, pp. 19-44, Springer-Verlag 1995.

Smith, Burton. "Folklore and Reality in High Performance Computing Slide Presentation." 1995.

Smith, Burton. "The Quest for General-Purpose Parallel Computing." 1994.

Alverson, Gail et al. "Exploiting Heterogeneous Parallelism on a Multithreaded Multiprocessor." 6th ACM International Conference on Supercomputing, Washington DC, Jul. 1992.

Callahan, David. "Recognizing and Parallelizing Bounded Recurrences." Fourth Workshop on Languages and Compilers for Parallel Computing. pp. 169-184. Aug. 1991.

Callahan, David et al. "Register Allocation via Hierarchical Graph Coloring." ACM SIGPLAN '91 Conference on Programming Language Design and Implementation, Jun. 1991.

Alverson, Robert. "Integer Division Using Reciprocals." 10th IEEE Symposium on Computer Arithmetic, Jun. 1991.

Callahan, David et al. "Improving Register Allocation for Subscripted Variables." ACM SIGPLAN Conference on Programming Language Design and Implementation, Jun. 1990.

Alverson, Robert et al. "The Tera Computer System." ACM International Conference on Supercomputing, pp. 1-6, Jun. 1990.

Smith, Burton. "The End of Architecture." Keynote Address, 17th Annual Symposium on Computer Architecture, Seattle, Washington, May 1990.

Alverson, Gail et al. "A Future-Based Parallel Language for a General Purpose Highly Parallel Computer." Languages and Compilers for Parallel Computing. pp. 95-113, MIT Press, Cambridge, Massachusetts, 1990.

"MIT Alewife Project: Home Page." retrieved from URL: http://catfish.csail.mit.edu/alewife/ on Jul. 2, 2004.

Arvind and R.A. Innaucci. "Two Fundamental Issues in Multiprocessing." In Proc. Of DFVLF-Conf. 1987 on Par.Proc.in Science and Eng., Bonn-Bad Godesberg, W. Germany, Jun. 1987.

Heuring, Vincent P. and Jordan, Harry F. "Computer Systems and Architecture." Reading, Mass.: Addison Wesley Longman, Inc., © 1997. pp. 35-37.

SUNSOFT. Multithreaded Programming Guide. 1995. Sunsoft, A Sun Microsystems, Inc. Business. Mountainview, CA.

SUNSOFT. Multithreaded Programming Guide. 1994. Sunsoft, A Sun Microsystems, Inc. Business. Mountainview, CA. pp. 6, 12-13, 22-34 and 87.

Hennessy, John L. et al. "Computer Architecture A Quantitative Approach." Second Edition. San Francisco, CA: Morgan Kaufmann Publishers, Inc. 1996. pp. 70-73 and 87-89.

Patterson et al. "Computer Organization & Design: The Hardware/Software Interface." 1998. Morgan Kaufmann Publishers, Inc. Second Edition. pp. 592-593.

Silberschatz et al. "Operating Systems Concepts." 1994. Addison-Wesley Publishing Company. Fourth Edition. pp. 267-269, 271-272, 275.

Zilles, Craig B. et al. "The Use of Multithreading for Exception Handling." *micro*, p. 219 32nd Annual International Symposium on Microarchitecture.

Dorai, Gautham K. et al. "Transparent Threads: Resource Sharing in SMT Processors for High-Single Thread Performance." Proceedings of the International Conference on Parallel Architectures and Compilation Techniques 2002.

MIPS32™ Architecture for Programmers vol. II The MIPS32™ Instruction Set. Revision 2.00. pp. 231 & 311. Document No. MD00086. Jun. 9, 2003. MIPS Technologies, Inc.

\* cited by examiner

Fig. 3B

MFTR Instruction
⟵ 350

Source Register Selection Table

| u Value | sel Value | Register Selected | |
|---|---|---|---|
| 0 | n | Coprocessor 0 Register number rt, sel = sel | |
| 1 | 0 | GPR[rt] | |
| 1 | 1 | rt Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rt, Reserved, Unpredictable | |
| 1 | 2 | FPR[rt] | |
| 1 | 3 | FPCR[rt] | |
| 1 | 4 | Cop2 Data[n], where n is composed by concatenating rx with rt, with rx providing the most significant bits. | |
| 1 | 5 | Cop2 Control[n], where n is composed by concatenating rx with rt, with rx providing the most significant bits. | |
| 1 | >5 | Reserved, Unpredictable | |

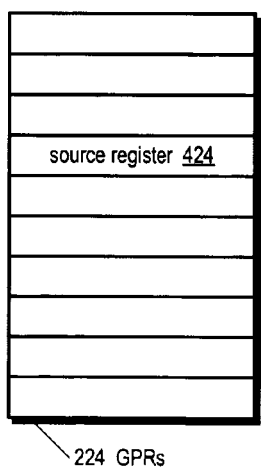

Fig. 4A

MTTR Instruction

MTTR rt, rd, u, sel, h

| 31 | 26 25 | 21 20 | 16 15 | 11 10 | 6 5 | 4 | 3 | 2 0 |
|---|---|---|---|---|---|---|---|---|
| opcode 302 | sub-opcode 404 | rt 306 | rd 308 | rx 312 | u 314 | h 316 | 0 | sel 318 |

The source register is specified by the rt field of the MTTR instruction.

The destination register within the specified thread context and VPE is specified by a combination of the rd, rx, u, h, and sel fields of the MTTR instruction.

issuing thread context target thread context

The TargVPE value in the VPEControl Register specifies the VPE to which the specified target thread context belongs.

destination register 422

TargVPE 334

TargTC 332 source register 424

The TargTC value in the VPEControl Register specifies the thread context to which the destination register belongs.

The destination register, which is a register of the target thread context, receives the contents of the destination register, which is a register of the target thread context issuing the MTTR instruction.

224 GPRs

Fig. 4B

MTTR Instruction

450

Destination Register Selection Table

| u Value | sel Value | Register Selected | |
|---|---|---|---|
| 0 | n | Coprocessor 0 Register number rd, sel = sel | |
| 1 | 0 | GPR[rd] | |
| 1 | 1 | rd Value | Selection |
| | | 0 | Lo Register / Lo component of DSP Accumulator 0 |
| | | 1 | Hi Register / Hi component of DSP Accumulator 0 |
| | | 2 | ACX Register / ACX component of Accumulator 0 |
| | | 4 | Lo component of DSP Accumulator 1 |
| | | 5 | Hi component of DSP Accumulator 1 |
| | | 6 | ACX component of DSP Accumulator 1 |
| | | 8 | Lo component of DSP Accumulator 2 |
| | | 9 | Hi component of DSP Accumulator 2 |
| | | 10 | ACX component of DSP Accumulator 2 |
| | | 12 | Lo component of DSP Accumulator 3 |
| | | 13 | Hi component of DSP Accumulator 3 |
| | | 14 | ACX component of DSP Accumulator 3 |
| | | 16 | DSPControl register of DSP Accumulator |
| | | Other Values of rd, Reserved, Unpredictable | |
| 1 | 2 | FPR[rd] | |
| 1 | 3 | FPCR[rd] | |
| 1 | 4 | Cop2 Data[n], where n is composed by concatenating rx with rd, with rx providing the most significant bits. | |
| 1 | 5 | Cop2 Control[n], where n is composed by concatenating rx with rd, with rx providing the most significant bits. | |
| 1 | >5 | Reserved, Unpredictable | |

Fig. 5A

Multithreading-Related Registers

500

Register Table

| Register Name | CP0 Register Number (rt/rd) | Register Select Number (sel) | Description |
|---|---|---|---|
| MVPControl 501 | 0 | 1 | Per-Processor register containing global multithreading configuration data |
| MVPConf0 502 | 0 | 2 | Per-Processor multi-VPE dynamic configuration information |
| MVPConf1 503 | 0 | 3 | Per-Processor multi-VPE dynamic configuration information |
| VPEControl 504 | 1 | 1 | Per-VPE register containing thread configuration data |
| VPEConf0 505 | 1 | 2 | Per-VPE multi-thread configuration information |
| VPEConf1 506 | 1 | 3 | Per-VPE multi-thread configuration information |
| YQMask 591 | 1 | 4 | Per-VPE register defining which YIELD qualifier bits may be used without generating an exception |
| VPESchedule 592 | 1 | 5 | Per-VPE register to manage scheduling of a VPE within a processor |
| VPEScheFBack 593 | 1 | 6 | Per-VPE register to provide scheduling feedback to software |
| TCStatus 508 | 4 | 1 | Per-TC status information |
| TCPC 594 | 4 | 2 | Per-TC value of restart program counter for the associated thread of execution |
| TCHalt 509 | 4 | 3 | Per-TC register controlling Halt state of TC |
| TCContext 595 | 4 | 4 | Per-TC Read/Write Storage for OS use |
| TCSchedule 596 | 4 | 5 | Per-TC register to manage scheduling of a TC |
| TCScheFBack 597 | 4 | 6 | Per-TC register to provide scheduling feedback to software |

Fig. 5B

MVPControl Register

| Fields | | Description | Read/Write | Reset State |
|---|---|---|---|---|
| Name | Bits | | | |
| STLB | 2 | Share TLBs. Modifiable only if the VPC bit was set prior to the write to the register of a new value. When set, the full compliment of TLBs of a processor is shared by all VPEs on the processor, regardless of the programming of the Config1.MMU_Size register fields.<br><br>When STLB is set:<br>• The virtual address and ASID spaces are unified across all VPEs sharing the TLB.<br>• The TLB logic must ensure that a TLBWR instruction can never write to a TLB entry which corresponds to the valid Index register value of any VPE sharing the TLB.<br>• The creation of duplicate TLB entries is silently suppressed instead of generating a Machine Check exception.<br>• TLBWRs may have UNPREDICTABLE results if there are fewer total unwired TLB entries than there are operational VPEs sharing the TLB.<br>• TLBWRs may have UNPREDICTABLE results if the Wired register values are not identical across all VPEs sharing the TLB.<br><br>For correct software operation, it is recommended that all MMU_Size fields be set to the size of the shared TLB when STLB is set. When not in use for TLB maintenance, software should leave the Index register of each VPE set to an invalid value, with the P bit set. | R/RW | 0 |
| VPC | 1 | Indicates that Processor is in a VPE Configuration State. When VPC is set, some normally "Preset" configuration register fields become writable, to allow for dynamic configuration of processor resources.<br><br>Settable by software only if the VPEConf0.MVP bit is also set for the VPE issuing the modifying instruction, the VPC bit may be cleared regardless of the MVP state, allowing the processor to de-configure its own MVP capability.<br><br>Processor behavior is UNDEFINED if VPC and EVP are both in a set state at the same time. | R/RW | 0 |
| EVP | 0 | Enable Virtual Processors. Modifiable only if the VPEConf0.MVP bit is set for the VPE issuing the modifying instruction. Set by EVPE instruction and cleared by DVPE instruction. If set, all activated VPEs on a processor fetch and execute independently. If cleared, only a single instruction stream on a single VPE can run. | R/RW | Preset |
| 0 | 31:3 | Must be written as zero; return zero on read. | 0 | 0 |

Fig. 5C

MVPConf0 Register

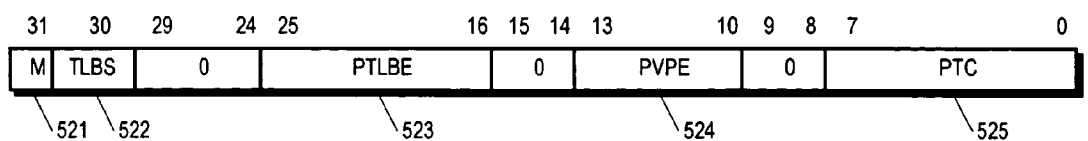

| Fields | | Description | Read/Write | Reset State |
|---|---|---|---|---|
| Name | Bits | | | |
| M | 31 | This bit is reserved to indicate that a MVPConf1 register is present. If the MVPConf1 register is not implemented, this bit should read as a 0. If the MVPConf1 register is implemented, this bit should read as a 1. | R | Preset |
| TLBS | 30 | TLB Sharable. Indicates that TLB sharing amongst all VPEs of a VMP is possible. TLB sharing is enabled by the STLB bit of the MVPControl register. | | |
| PTLBE | 25:16 | Total processor compliment of allocatable TLB entry pairs. | R | Preset |
| PVPE | 13:10 | Total processor compliment of VPE contexts - 1 | R | Preset |
| PTC | 7:0 | Total processor compliment of TCs - 1 | R | Preset |
| 0 | 29:24, 15:14, 9:8 | Reserved. Reads as zero, must be written as zero. | R | 0 |

Fig. 5D

MVPConf1 Register 503

| 31 | 30 | 29  28 | 27      20 | 19  18 | 17      10 | 9  8 | 7      0 |
|----|----|--------|------------|--------|------------|------|----------|
|CIM |CIF | 0      | PCX        | 0      | PCP2       | 0    | PCP1     |

531, 532, 533, 534, 535

| Fields | | Description | Read/ Write | Reset State |
|---|---|---|---|---|
| Name | Bits | | | |
| CIM | 31 | Allocatable CP1 coprocessors are media-extension capable | R | Preset |
| CIF | 30 | Allocatable CP1 coprocessors are floating-point capable | R | Preset |
| PCX | 27:20 | Total processor compliment of CorExtend(tm) UDI state instantiations available, for UDI blocks with persistent state. | R | Preset |
| PCP2 | 17:10 | Total processor compliment of integrated and allocatable Coprocessor 2 contexts | R | Preset |
| PCP1 | 7:0 | Total processor compliment of integrated and allocatable FP/MDMX Coprocessors contexts | R | Preset |
| 0 | 29:28, 19:18, 9:8 | Reserved. Reads as zero, must be written as zero. | R | 0 |

Fig. 5E

VPEControl Register — 504

| 31 | 29 28 | 26 25 | 24 23 | 16 | 15 | 14 13 | 10 | 9 8 | 7 | 0 |
|---|---|---|---|---|---|---|---|---|---|---|
| 0 | EXCPT | 0 | CurTC | | TE | 0 | TargVPE | 0 | TargTC | |

541, 542, 543, 334, 332

| Fields | | Description | | | Read/Write | Reset State |
|---|---|---|---|---|---|---|
| Name | Bits | | | | | |
| EXCPT | 28:26 | Exception code of most recently dispatched Thread exception | Value | Meaning | R | 0 |
| | | | 0 | Thread Underflow | | |
| | | | 1 | Thread Overflow | | |
| | | | 2 | Invalid YIELD Qualifier | | |
| | | | 3 | Gating Storage Exception | | |
| | | | 4-7 | Reserved | | |
| CurTC | 23:16 | Indicates the number (index) of the TC of the thread issuing the MFC0 instruction inspecting the register. When VPEControl is inspected via an MFTR instruction, the value represents the last TC to have issued an instruction, as of some implementation-dependent previous cycle. | | | R | Preset, typically same value as MinTC field of VPEConf0 |
| TE | 15 | Threads Enabled. Set by EMT instruction, cleared by DMT instruction. If set, multiple TCs may be simultaneously active. If cleared, only one thread may execute on the VPE. | | | R/W | 0 |
| TargVPE | 13:10 | VPE number to be used on MTTR and MFTR instructions when the MVP bit of MVPControl register is set. If MVP is not set, TargVPE is ignored, and the instructions implicitly reference the VPE containing the TC executing the MTTR/MFTR instruction, i.e. that which is referenced by the CPUNum field of the EBase register, as seen by the instruction stream. | | | R/W | Undefined |
| TargTC | 7:0 | TC number to be used on MTTR and MFTR instructions. | | | R/W | Undefined |
| 0 | 31:29, 24:24, 14, 9:8 | Must be written as zero; return zero on read. | | | 0 | 0 |

Fig. 5F

VPEConf0 Register 505

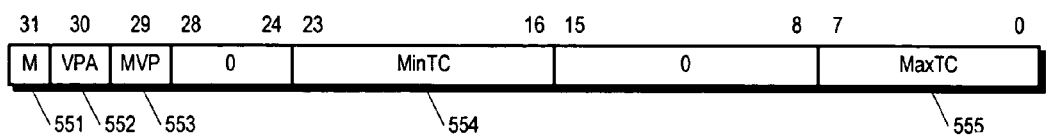

| Fields | | Description | Read/ Write | Reset State |
|---|---|---|---|---|
| Name | Bits | | | |
| M | 31 | This bit is reserved to indicate that a VPEConf1 register is present. If the VPEConf1 register is not implemented, this bit should read as a 0. If the VPEConf1 register is implemented, this bit should read as a 1. | R | Preset |
| VPA | 30 | Virtual Processor Activated. If set, the VPE will schedule threads and execute instructions so long as the EVP bit of the MVPControl register enables multi-VPE execution. | R | Preset |
| MVP | 29 | Master Virtual Processor. If set, the VPE can access the registers of other VPEs of the same VMP, using MTTR/MFTR, and can modify the contents of the MVPControl register, thus acquiring the capability to manipulate and configure other VPEs sharing the same processor. | R | Preset |
| MinTC | 23:16 | Minimum valid TargTC/CurTC value within VPE | R | Preset |
| MaxTC | 7:0 | Maximum valid TargTC/CurTC value within VPE | R | Preset |
| 0 | 28:24, 15:8 | Reserved. Reads as zero, must be written as zero. | R | 0 |

Fig. 5G

VPEConf1 Register  ← 506

| 31 | 28 | 27 | 20 | 19 | 18 | 17 | 10 | 9 | 8 | 7 | 0 |
|---|---|---|---|---|---|---|---|---|---|---|---|
| 0 | | NCX | | 0 | | NCP2 | | 0 | | NCP1 | |

\561  \562  \563

| Fields | | Description | Read/Write | Reset State |
|---|---|---|---|---|
| Name | Bits | | | |
| NCX | 27:20 | Number of CorExtend(tm) UDI state instantiations available, for UDI blocks with persistent state. | R | Preset |
| NCP2 | 17:10 | Number of Coprocessor 2 contexts available. | R | Preset |
| NCP1 | 7:0 | Number of Coprocessor 1 contexts available | R | Preset |
| 0 | 31:28, 19:18, 9:8 | Reserved. Reads as zero, must be written as zero. | R | 0 |

*Fig. 5H*
YQMask Register — 591
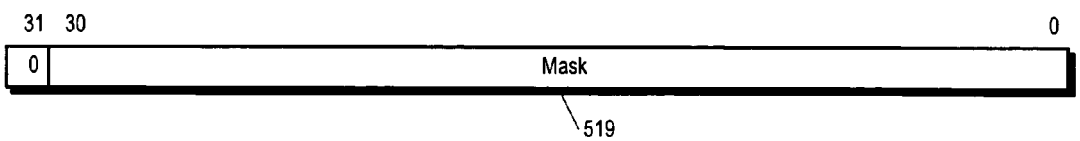
| Fields | | Description | Read/Write | Reset State |
|---|---|---|---|---|
| Name | Bits | | | |
| Mask | 30:0 | Bit vector which determines which values may be used as external state qualifiers by YIELD instructions. | R/W | 0 |
| 0 | 31 | Must be written as zero; return zero on read. | 0 | 0 |
VPESchedule Register — 592
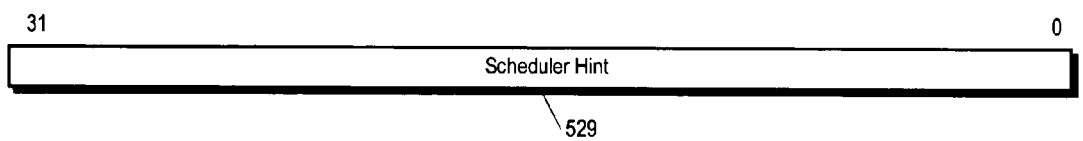
VPEScheFBack Register — 593
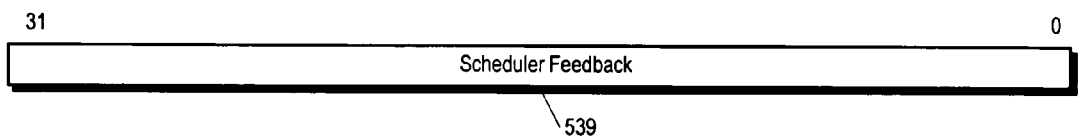

Fig. 5J

TCStatus Register 508

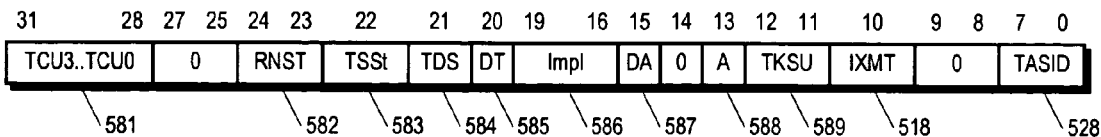

| Fields | | Description | Read/Write | Reset State |
|---|---|---|---|---|
| Name | Bits | | | |
| TCU3.. TCU0 | 31:28 | Controls access of a TC to coprocessors 3,2,1, and 0 respectively. | R/W | 0 |
| RNST | 24:23 | Run State of TC. Indicates the Running vs. Blocked state of the TC and the reason for blockage. Value is stable only if TC is Halted and examined by another TC using an MFTR operation. <br><br> Val / Meaning <br> 0 / Running <br> 1 / Blocked on WAIT <br> 2 / Blocked on YIELD <br> 3 / Blocked on Gating Storage | R | 0 |
| TSSt | 22 | Thread Single Step. This bit represents the per-TC instantiation of the SSt bit of the EJTAG Debug. | R/W | 0 |
| TDS | 21 | Thread stopped in branch Delay Slot. If a TC is Halted such that the next instruction to issue would be an instruction in a branch delay slot, the TCPC register will contain the address of the branch instruction, and the TDS bit will be set. | R | 0 |
| DT | 20 | Dirty TC. This bit is set by hardware whenever any software-visible register value of the associated TC is written, including writes of GPR rd operands of FORK instructions. | R/W | 0 |
| Impl | 19:16 | These bits are implementation dependent | ImplDep | ImplDep |
| DA | 15 | Dynamic Allocation enable. If set, TC may be allocated/ deallocated/scheduled by the FORK and YIELD instructions. | R/W | 0 |
| A | 13 | Thread Activated. Set automatically when a FORK instruction allocates the TC, and cleared automatically when a YIELD $0 instruction deallocates it. | R/W | 1 for default/ reset TC, 0 for others |
| TKSU | 12:11 | This is the per-TC Kernel/Supervisor/User state. | R/W | Undefined |
| IXMT | 10 | Interrupt Exempt. If set, the associated TC will not be used by asynchronous exception handlers such as interrupts. | R/W | 0 |
| TASID | 7:0 | This is the per-TC ASID value. | R/W | Undefined |
| 0 | 27:25, 14, 9:8 | Must be written as zero; return zero on read. | 0 | 0 |

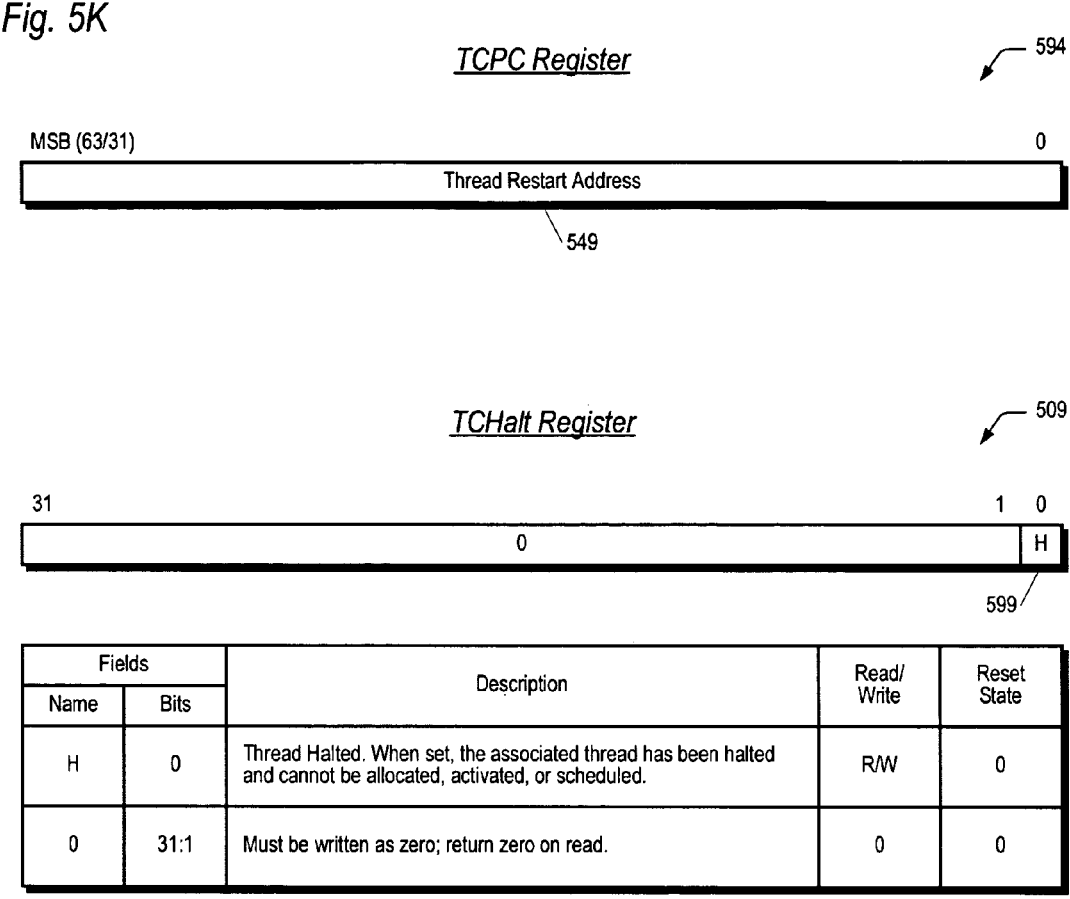

Fig. 5L
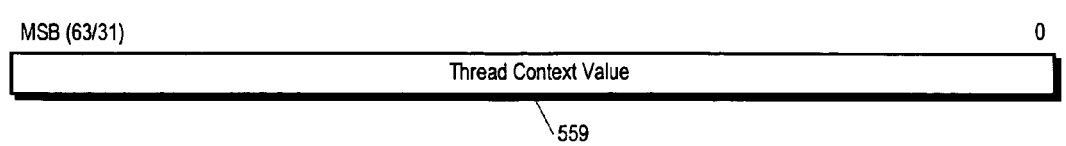
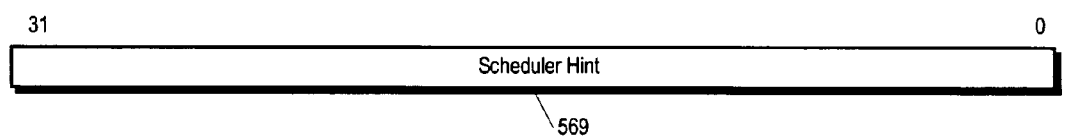
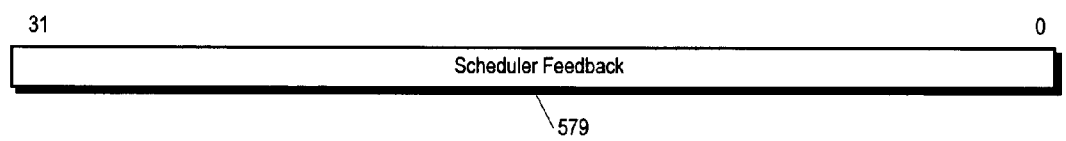

MFTR Data Paths

MTTR Data Paths

Thread Context Management using MFTR/MTTR Instructions

Thread Context Management using MFTR/MTTR Instructions
(Alternate Embodiment)

*Explicit Thread Context Allocation and Initialization using MFTR/MTTR Instructions*

APPARATUS, METHOD, AND INSTRUCTION FOR SOFTWARE MANAGEMENT OF MULTIPLE COMPUTATIONAL CONTEXTS IN A MULTITHREADED MICROPROCESSOR

CROSS REFERENCE TO RELATED APPLICATION(S)

This application is a continuation-in-part (CIP) of the following co-pending Non-Provisional U.S. patent applications, which are hereby incorporated by reference in their entirety for all purposes:

| Ser. No. (Docket No.) | Filing Date | Title |
| --- | --- | --- |
| 10/684,350 (MIPS.0188-01-US) | Oct. 10, 2003 | MECHANISMS FOR ASSURING QUALITY OF SERVICE FOR PROGRAMS EXECUTING ON A MULTITHREADED PROCESSOR |
| 10/684,348 (MIPS.0189-00-US) | Oct. 10, 2003 | INTEGRATED MECHANISM FOR SUSPENSION AND DEALLOCATION OF COMPUTATIONAL THREADS OF EXECUTION IN A PROCESSOR |

The above co-pending Non-Provisional U.S. patent applications claim the benefit of the following U.S. Provisional Applications, each of which this application also claims the benefit of, and which are hereby incorporated by reference in their entirety for all purposes:

| Ser. No. (Docket No.) | Filing Date | Title |
| --- | --- | --- |
| 60/499,180 (MIPS.0188-00-US) | Aug. 28, 2003 | MULTITHREADING APPLICATION SPECIFIC EXTENSION |
| 60/502,358 (MIPS.0188-02-US) | Sep. 12, 2003 | MULTITHREADING APPLICATION SPECIFIC EXTENSION TO A PROCESSOR ARCHITECTURE |
| 60/502,359 (MIPS.0188-03-US) | Sep. 12, 2003 | MULTITHREADING APPLICATION SPECIFIC EXTENSION TO A PROCESSOR ARCHITECTURE |

This application is related to and filed concurrently with the following Non-Provisional U.S. Patent Applications, each of which is incorporated by reference in its entirety for all purposes:

| Ser. No. (Docket No.) | Filing Date | Title |
| --- | --- | --- |
| _____ (MIPS.0189-01-US) | Aug. 27, 2004 | INTEGRATED MECHANISM FOR SUSPENSION AND DEALLOCATION OF COMPUTATIONAL THREADS OF EXECUTION IN A PROCESSOR |
| _____ (MIPS.0192-00-US) | Aug. 27, 2004 | APPARATUS, METHOD, AND INSTRUCTION FOR INITIATION OF CONCURRENT INSTRUCTION STREAMS IN A MULTITHREADING MICROPROCESSOR |
| _____ (MIPS.0193-00-US) | Aug. 27, 2004 | MECHANISMS FOR DYNAMIC CONFIGURATION OF VIRTUAL PROCESSOR RESOURCES |

FIELD OF THE INVENTION

The present invention relates in general to the field of multithreaded processors, and particularly to instructions for communicating between different thread contexts in a multi-threaded processor.

BACKGROUND OF THE INVENTION

Designers employ many techniques to increase microprocessor performance. Most microprocessors operate using a clock signal running at a fixed frequency. Each clock cycle, the circuits of the microprocessor perform their respective functions. According to Hennessy and Patterson, the true measure of a microprocessor's performance is the time required to execute a program or collection of programs. From this perspective, the performance of a microprocessor is a function of its clock frequency, the average number of clock cycles required to execute an instruction (or alternately stated, the average number of instructions executed per clock cycle), and the number of instructions executed in the program or collection of programs. Semiconductor scientists and engineers are continually making it possible for microprocessors to run at faster clock frequencies, chiefly by reducing transistor size, resulting in faster switching times. The number of instructions executed is largely fixed by the task to be performed by the program, although it is also affected by the instruction set architecture of the microprocessor. However, large performance increases have been realized by architectural and organizational notions that improve the instructions per clock cycle, in particular by notions of parallelism.

One notion of parallelism that has improved the instructions per clock cycle of microprocessors, as well as their clock frequency, is pipelining. Pipelining overlaps execution of multiple instructions within pipeline stages of the microprocessor. In an ideal situation, each clock cycle one instruction moves down the pipeline to a new stage, which performs a different function on the instructions. Thus, although each individual instruction takes multiple clock cycles to complete, because the multiple cycles of the individual instructions overlap, the average clocks per instruction is reduced. The performance improvements of pipelining may be realized to the extent that the instructions in the program permit it, namely to the extent that an instruction does not depend upon its predecessors in order to execute and can therefore execute in parallel with its predecessors, which is commonly referred to as instruction-level parallelism. Another way in which instruction-level parallelism is exploited by contemporary microprocessors is the issuing of multiple instructions for execution per clock cycle, commonly referred to as superscalar microprocessors.

The parallelism discussed above pertains to parallelism at the individual instruction-level. However, the performance improvement that may be achieved through exploitation of instruction-level parallelism is limited. Various constraints imposed by limited instruction-level parallelism and other performance-constraining issues have recently renewed an interest in exploiting parallelism at the level of blocks, or sequences, or streams, or threads of instructions, commonly referred to as thread-level parallelism. A thread is simply a sequence, or stream, of program instructions. A multi-threaded microprocessor concurrently executes multiple threads according to some scheduling policy that dictates the fetching and issuing of instructions of the various threads, such as interleaved, blocked, or simultaneous multithreading. A multithreaded microprocessor typically allows the multiple threads to share the functional units of the microprocessor (e.g., instruction fetch and decode units, caches, branch prediction units, and load/store, integer, floating-point, SIMD, etc. execution units) in a concurrent fashion. However, multithreaded microprocessors include multiple sets of resources, or thread contexts, for storing the unique state of each thread to facilitate the ability to quickly switch between threads to fetch and issue instructions. For example, each thread context includes its own program counter for instruction fetching and thread identification information, and typically also includes its own general purpose register set.

One example of a performance-constraining issue addressed by multithreading microprocessors is the fact that accesses to memory outside the microprocessor that must be performed due to a cache miss typically have a relatively long latency. The memory access time of a contemporary microprocessor-based computer system is commonly between one and two orders of magnitude greater than the cache hit access time. Consequently, while the pipeline is stalled waiting for the data from memory, some or all of the pipeline stages of a single-threaded microprocessor may be idle performing no useful work for many clock cycles. Multithreaded microprocessors may alleviate this problem by issuing instructions from other threads during the memory fetch latency, thereby enabling the pipeline stages to make forward progress performing useful work, somewhat analogously to, but at a finer level of granularity than, an operating system performing a task switch in response to a page fault. Other examples of performance-constraining issues are pipeline stalls and their accompanying idle cycles due to a branch misprediction and concomitant pipeline flush, or due to a data dependence, or due to a long latency instruction such as a divide instruction. Again, the ability of a multithreaded microprocessor to issue instructions from other threads to pipeline stages that would otherwise be idle may significantly reduce the time required to execute the program or collection of programs comprising the threads. Another problem, particularly in embedded systems, is the wasted overhead associated with interrupt servicing. Typically, when an input/output device signals an interrupt event to the microprocessor, the microprocessor switches control to an interrupt service routine, which requires saving of the current program state, servicing the interrupt, and restoring the current program state after the interrupt has been serviced. A multithreaded microprocessor provides the ability for event service code to be its own thread having its own thread context. Consequently, in response to the input/output device signaling an event, the microprocessor can quickly—perhaps in a single clock cycle—switch to the event service thread, thereby avoiding incurring the conventional interrupt service routine overhead.

Just as the degree of instruction-level parallelism dictates the extent to which a microprocessor may take advantage of the benefits of pipelining and superscalar instruction issue, the degree of thread-level parallelism dictates the extent to which a microprocessor may take advantage of multithreaded execution. An important characteristic of a thread is its independence of the other threads being executed on the multithreaded microprocessor. A thread is independent of another thread to the extent its instructions do not depend on instructions in other threads. The independent characteristic of threads enables the microprocessor to execute the instructions of the various threads concurrently. That is, the microprocessor may issue instructions of one thread to execution units without regard to the instructions being issued of other threads. To the extent that the threads access common data, the threads themselves must be programmed to synchronize data accesses with one another to insure proper operation such that the microprocessor instruction issue stage does not need to be concerned with the dependences.

As may be observed from the foregoing, a processor with multiple thread contexts concurrently executing multiple threads may reduce the time required to execute a program or collection of programs comprising the multiple threads. However, the introduction of multiple thread contexts also introduces a new set of problems, particularly for system software, to manage the multiple instruction streams and their associated thread contexts. In a conventional multithreaded processor, a given thread may only access its own thread context, and if the thread has a high enough privilege level, it may also access portions of the global processor context, i.e., processor context that is shared by the various thread contexts of the processor. That is, the present inventors are not aware of a processor that provides an instruction for one thread to read or write the thread context of another thread. Consequently, system software executing in one thread context, in order to read or write another thread's context, requires the cooperation of the other thread. For example, the system software thread needing to initialize a new thread context may write the new thread context values to a predetermined location in memory and then cause the new thread context to take an exception. The exception handler thread executing on the new thread context loads the values from the predetermined memory location into its own thread context. This limitation may be inefficient and may increase the complexity of the operating system. Therefore, what is needed are instructions that enable a thread executing in one thread context to access the thread contexts in which other threads are concurrently executing on the microprocessor without requiring cooperation from the other thread context.

BRIEF SUMMARY OF INVENTION

The present invention provides a multithreading microprocessor having a plurality of thread contexts. The microprocessor provides instructions that enable a thread context issuing the instructions to move a value between itself and a target thread context distinct from the issuing thread context independent of cooperation from the target thread context. The instructions employ an operand to specify the target thread context. In one embodiment, the microprocessor also is a virtual multiprocessor including a plurality of virtual processing elements. Each virtual processing element includes a plurality of thread contexts. The instructions also employ a second operand to specify the target virtual processing element.

In one aspect, the present invention provides an instruction for execution on a multithreading microprocessor having a plurality of thread contexts, wherein the instruction is in an instruction stream issuing from a first of the plurality of thread contexts. The instruction includes an operand, for specifying a second of the plurality of thread contexts. The second of the plurality of thread contexts is distinct from the first of the plurality of thread contexts. The instruction also includes an opcode, for instructing the microprocessor to move a value from a source thread context to a destination thread context. One of the source and destination thread contexts is the second of the plurality of thread contexts, and the other of the source and destination thread contexts is the first of the plurality of thread contexts.

In another aspect, the present invention provides an instruction for execution on a multithreading microprocessor having a plurality of virtual processing elements and a plurality of thread contexts within each of the plurality of virtual processing elements. The instruction includes a first operand, for specifying one of the plurality of virtual processing elements. The instruction also includes a second operand, for specifying one of the plurality of thread contexts of the one of the virtual processing elements. The instruction also includes an opcode, for instructing the microprocessor to move a value from a first thread context to a second thread context. One of the first and second thread contexts is one of the plurality of thread contexts of one of the plurality of virtual processing elements specified by the first and second operands, and the other of the first and second thread contexts is one of the plurality of thread contexts of one of the plurality of virtual processing elements associated with an instruction stream including the instruction. The first and second thread contexts are distinct.

In another aspect, the present invention provides a multithreading microprocessor. The microprocessor includes a plurality of thread contexts and an instruction decoder, coupled to the plurality of thread contexts, for decoding an instruction issuing from a first of the plurality of thread contexts. The instruction employs an operand for specifying a second of the plurality of thread contexts. The second of the plurality of thread contexts is distinct from the first of the plurality of thread contexts. The instruction includes an opcode for instructing the microprocessor to move a value from a source thread context to a destination thread context. One of the source and destination thread contexts is the second of the plurality of thread contexts. The other of the source and destination thread contexts is the first of the plurality of thread contexts. The microprocessor also includes selection logic, coupled to the plurality of thread contexts, for moving the value from the source thread context to the destination thread context in response to the instruction decoder decoding the instruction.

In another aspect, the present invention provides a method for a first thread of execution having a first thread context to modify a second thread context associated with a second thread of execution in a multithreaded microprocessor without cooperation from the second thread of execution. The method includes issuing an instruction whose location is specified by a program counter of the first thread context, and copying a value from the first thread context to the second thread context in response to issuing the instruction.

In another aspect, the present invention provides a method for a first thread of execution having a first thread context to examine a second thread context associated with a second thread of execution in a multithreaded microprocessor without cooperation from the second thread of execution. The method includes issuing an instruction whose location is specified by a program counter of the first thread context, and copying a value from the second thread context to the first thread context in response to issuing the instruction.

In another aspect, the present invention provides a multithreading processing system. The processing system includes a microprocessor having a plurality of thread contexts for storing state information associated with a corresponding plurality of instruction streams, which concurrently executes the plurality of instruction streams based on the plurality of thread contexts. The processing system also includes a memory, coupled to the microprocessor, which stores an instruction of a first of the plurality of instruction streams. The instruction specifies a first register of a first of the plurality of thread contexts associated with the first of the plurality of instruction streams. The instruction also specifies a second register of a second of the plurality of thread contexts. The first and second of the plurality of thread contexts are distinct. The microprocessor is configured to move a contents of the first register to the second register in response to the instruction.

In another aspect, the present invention provides a computer program product for use with a computing device. The computer program product includes a computer usable medium, having computer readable program code embodied in the medium, for causing a multithreading microprocessor. The computer readable program code includes first program code for providing a plurality of thread contexts. The computer readable program code also includes second program code for providing an instruction decoder, coupled to the plurality of thread contexts, for decoding an instruction issuing from a first of the plurality of thread contexts. The instruction employs an operand for specifying a second of the plurality of thread contexts. The second of the plurality of thread contexts is distinct from the first of the plurality of thread contexts. The instruction includes an opcode for instructing the microprocessor to copy a value from a source thread context to a destination thread context. One of the source and destination thread contexts is the second of the plurality of thread contexts. The other of the source and destination thread contexts is the first of the plurality of thread contexts. The computer readable program code also includes third program code for providing selection logic, coupled to the plurality of thread contexts, for moving the value from the source thread context to the destination thread context, in response to the instruction decoder decoding the instruction.

In another aspect, the present invention provides a computer data signal embodied in a transmission medium, including computer-readable program code for providing a multithreaded microprocessor for executing an instruction, the microprocessor having a plurality of thread contexts, wherein the instruction is in an instruction stream issuing from a first of the plurality of thread contexts. The program code includes first program code for providing an operand, for specifying a second of the plurality of thread contexts. The second of the plurality of thread contexts is distinct from the first of the plurality of thread contexts. The program code also includes second program code for providing an opcode, for instructing the microprocessor to move a value from a source thread context to a destination thread context. One of the source and destination thread contexts is the second of the plurality of thread contexts. The other of the source and destination thread contexts is the first of the plurality of thread contexts.

BRIEF DESCRIPTION OF THE DRAWINGS

FIG. 4 is a block diagram illustrating an MTTR instruction executed by the microprocessor of FIG. 1 according to the present invention.

FIG. 5 is a series of block diagrams illustrating various multithreading-related registers of the microprocessor of FIG. 1 according to one embodiment of the present invention.

DETAILED DESCRIPTION

Figure 1:
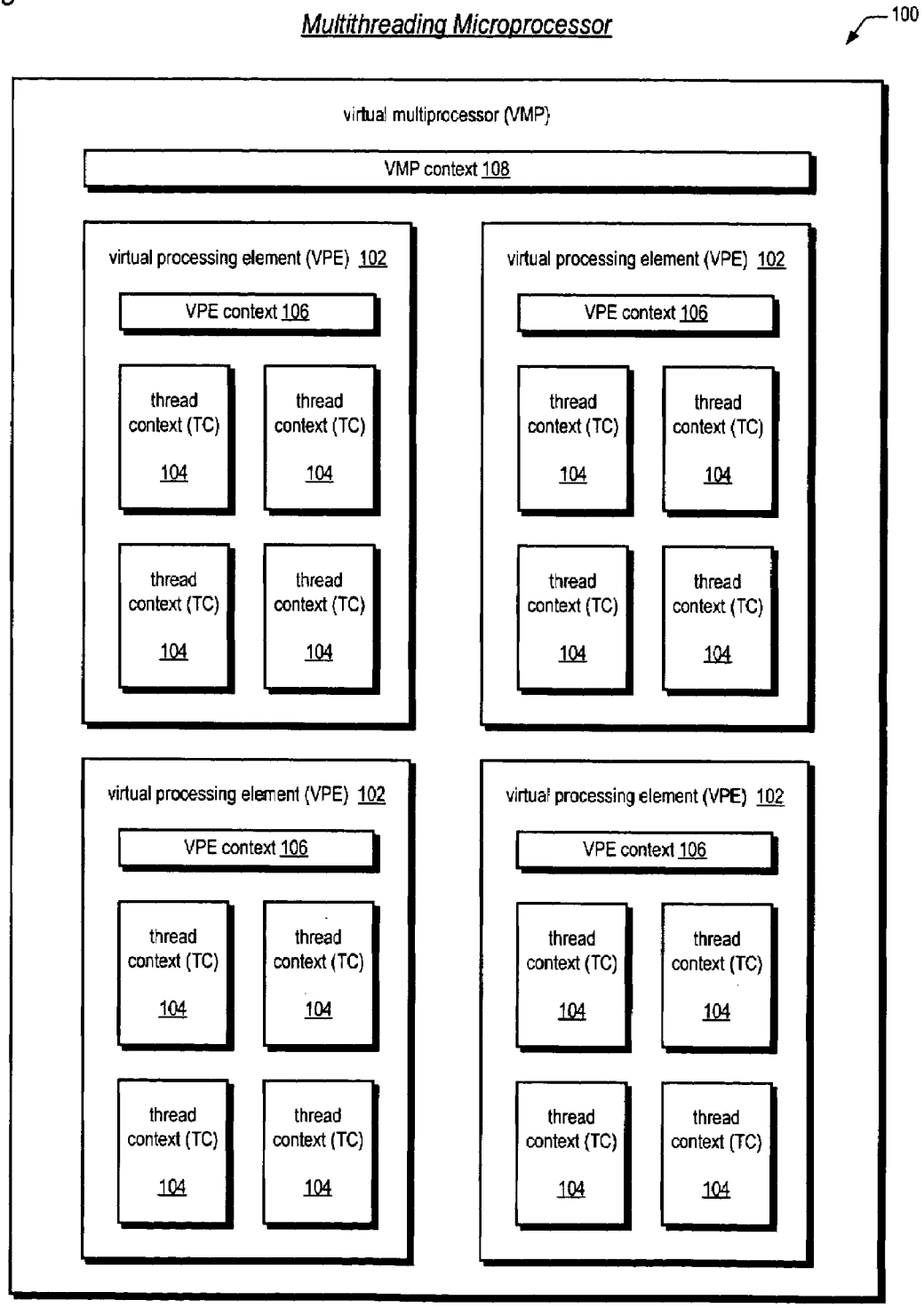
FIG. 1 is a block diagram illustrating a microprocessor according to the present invention.

Referring now to FIG. 1, a block diagram illustrating a microprocess 100 according to the present invention is shown. The microprocessor 100 includes a VMP context 108 and a plurality of virtual processing elements (VPEs) 102. Each VPE 102 includes a VPE context 106 and at least one thread context (TC) 104. The VMP context 108 comprises a collection of storage elements, such as registers or latches, and/or bits in the storage elements of the microprocessor 100 that describe the state of execution of the microprocessor 100. In particular, the VMP context 108 stores state related to global resources of the microprocessor 100 that are shared among the VPEs 102, such as the instruction cache 202, instruction fetcher 204, instruction decoder 206, instruction issuer 208, instruction scheduler 216, execution units 212, and data cache 242 of FIG. 2, or other shared elements of the microprocessor 100 pipeline described below. In one embodiment, the VMP context 108 includes the MVPControl Register 501, MVPConf0 Register 502, and MVPConf1 Register 503 of FIGS. 5B-5D described below.

A thread context 104 comprises a collection of storage elements, such as registers or latches, and/or bits in the storage elements of the microprocessor 100 that describe the state of execution of a thread. That is, the thread context describes the state of its respective thread, which is unique to the thread, rather than state shared with other threads of execution executing concurrently on the microprocessor 100. A thread—also referred to herein as a thread of execution, or instruction stream—is a sequence of instructions. The microprocessor 100 is a multithreading microprocessor. That is, the microprocessor 100 is configured to concurrently execute multiple threads of execution. By storing the state of each thread in the multiple thread contexts 104, the microprocessor 100 is configured to quickly switch between threads to fetch and issue instructions. The elements of a thread context 104 of various embodiments are described below with respect to the remaining Figures. Advantageously, the present microprocessor 100 is configured to execute the MFTR instruction 300 of FIG. 3 and the MTTR instruction 400 of FIG. 4 for moving thread context 104 information between the various thread contexts 104, as described in detail herein.

The VPE context 106 includes a collection of storage elements, such as registers or latches, and/or bits in the storage elements of the microprocessor 100 that describe the state of execution of a VPE 102, which enable an operating system to manage the resources of the VPE 102, such as virtual memory, caches, exceptions, and other processor configuration and status information. Consequently, a microprocessor 100 with N VPEs 102 is a virtual multiprocessor that appears to an operating system as an N-way symmetric multiprocessor. The VPEs 102 share various of the microprocessor 100 resources, such as the instruction cache 202, instruction fetcher 204, instruction decoder 206, instruction issuer 208, instruction scheduler 216, execution units 212, and data cache 242 of FIG. 2, transparently to the operating system. In one embodiment, each VPE 102 substantially conforms to a MIPS32 or MIPS64 Instruction Set Architecture (ISA) and a MIPS Privileged Resource Architecture (PRA), and the VPE context 106 includes the MIPS PRA Coprocessor 0 and system state necessary to describe an instantiation thereof. In one embodiment, the VPE context 106 includes the VPEControl Register 504, VPEConf0 Register 505, VPEConf1 Register 506, YQMask Register 591, VPESchedule Register 592, and VPEScheFBack Register 593 of FIGS. 5E-5H described below. In one respect, a VPE 102 may be viewed as an exception domain. That is, when one of the thread contexts 104 of a VPE 102 generates an exception, multithreading is suspended on the VPE 102 (i.e., only instructions of the instruction stream associated with the thread context 104 servicing the exception are fetched and issued), and each VPE context 106 includes the state necessary to service the exception. Once the exception is serviced, the exception handler may selectively re-enable multithreading on the VPE 102.

Figure 2:
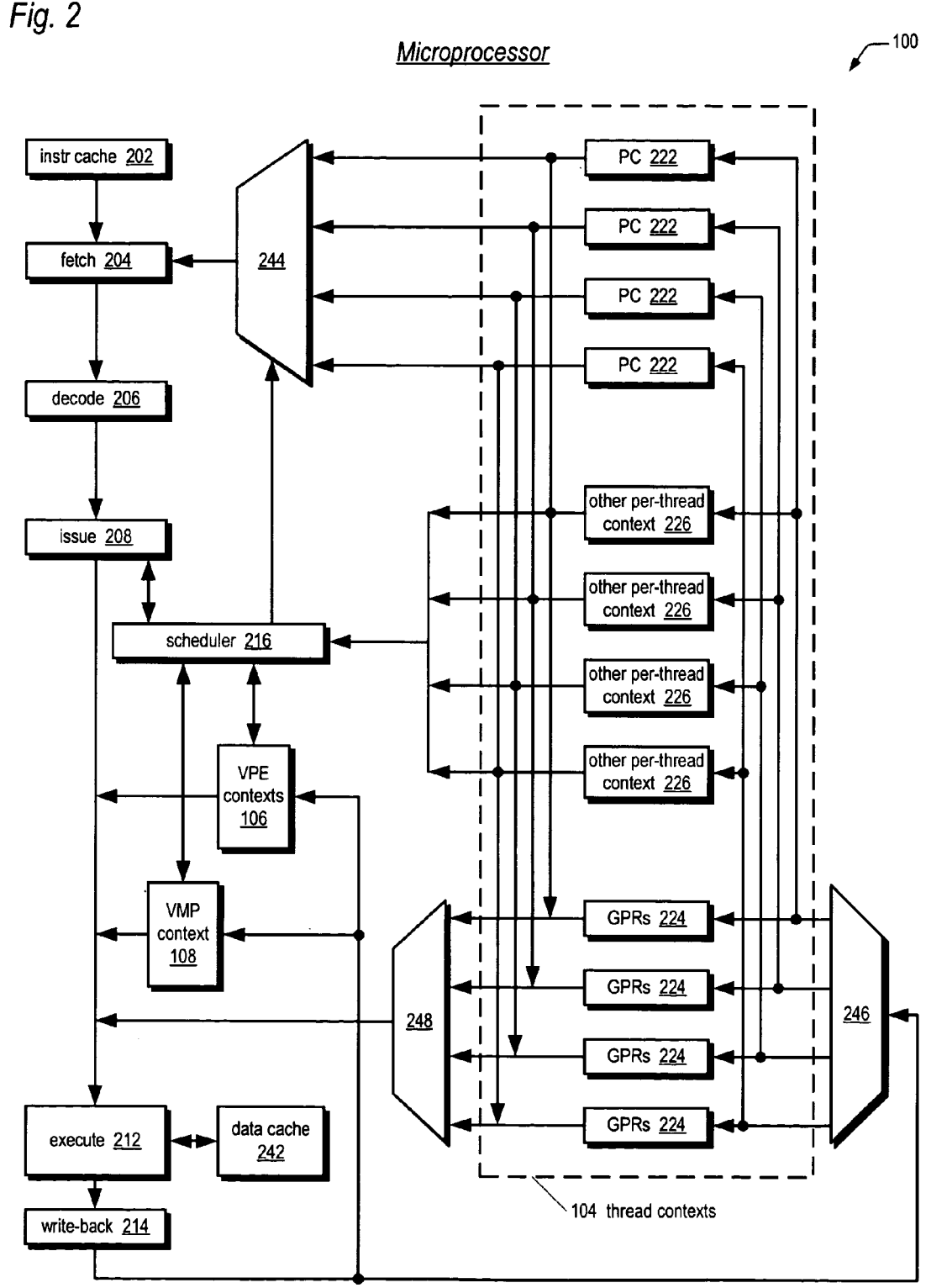
FIG. 2 is a block diagram illustrating in more detail the microprocessor of FIG. 1.

Referring now to FIG. 2, a block diagram illustrating in more detail the microprocessor 100 of FIG. 1 is shown. The microprocessor 100 is a pipelined microprocessor comprising a plurality of pipeline stages. The microprocessor 100 includes a plurality of thread contexts 104 of FIG. 1. The embodiment of FIG. 2 shows four thread contexts 104. In one embodiment, each thread context 104 comprises a program counter (PC) 222 for storing an address for fetching a next instruction in the associated instruction stream, a general purpose register (GPR) set 224 for storing intermediate execution results of the instruction stream issuing from the thread context based on the program counter 222 value, and other per-thread context 226. In one embodiment, the microprocessor 100 includes a multiplier unit, and the other thread context 226 includes registers for storing results of the multiplier unit specifically associated with multiply instructions in the instruction stream. In one embodiment, the other thread context 226 includes information for uniquely identifying each thread context 104. In one embodiment, the thread identification information includes information for specifying the execution privilege level of the associated thread, such as whether the thread is a kernel, supervisor, or user level thread, such as is stored in the TKSU bits 589 of the TCStatus Register 508 of FIG. 5J. In one embodiment, the thread identification information includes information for identifying a task or process comprising the thread. In particular, the task identification information may be used as an address space identifier (ASID) for purposes of translating physical addresses into virtual addresses, such as is stored in the TASID bits 528 of the TCStatus Register 508. In one embodiment, the other per-thread context 226 includes the TCStatus Register 508, TCPC Register 594, TCHalt Register 509, TCContext Register 595, TCSchedule Register 596, and TCScheFBack Register 597 of FIGS. 5J-5L.

The microprocessor 100 includes a scheduler 216 for scheduling execution of the various threads being concurrently executed by the microprocessor 100. The scheduler 216 is coupled to the VMP context 108 and VPE contexts 106 of FIG. 1 and to the other per-thread context 226. In particular, the scheduler 216 is responsible for scheduling fetching of instructions from the program counter 222 of the various thread contexts 104 and for scheduling issuing of the fetched instructions to execution units 212 of the microprocessor 100, as described below. The scheduler 216 schedules execution of the threads based on a scheduling policy of the microprocessor 100. The scheduling policy may include, but is not limited to, any of the following scheduling policies. In one embodiment, the scheduler 216 employs a round-robin, or time-division-multiplexed, or interleaved, scheduling policy that allocates a predetermined number of clock cycles or instruction issue slots to each ready thread in a rotating order. The round-robin policy is useful in an application in which fairness is important and a minimum quality of service is required for certain threads, such as real-time application program threads. In one embodiment, the scheduler 216 employs a blocking scheduling policy wherein the scheduler 216 continues to schedule fetching and issuing of a currently running thread until an event occurs that blocks further progress of the thread, such as a cache miss, a branch misprediction, a data dependency, or a long latency instruction. In one embodiment, the microprocessor 100 comprises a superscalar pipelined microprocessor, and the scheduler 216 schedules the issue of multiple instructions per clock cycle, and in particular, the issue of instructions from multiple threads per clock cycle, commonly referred to as simultaneous multithreading.

The microprocessor 100 includes an instruction cache 202 for caching program instructions fetched from a system memory of a system including the microprocessor 100, such as the MFTR/MTTR 300/400 instructions. In one embodiment, the microprocessor 100 provides virtual memory capability, and the fetch unit 204 includes a translation lookaside buffer for caching physical to virtual memory page translations. In one embodiment, each program, or task, executing on the microprocessor 100 is assigned a unique task ID, or address space ID (ASID), which is used to perform memory accesses and in particular memory address translations, and a thread context 104 also includes storage for an ASID associated with the thread. In one embodiment, the various threads executing on the microprocessor 100 share the instruction cache 202 and translation lookaside buffer. In another embodiment, each thread includes its own translation lookaside buffer.

The microprocessor 100 also includes a fetch unit 204, coupled to the instruction cache 202, for fetching program instructions, such as MFTR/MTTR 300/400 instructions, from the instruction cache 202 and system memory. The fetch unit 204 fetches instructions at an instruction fetch address provided by a multiplexer 244. The multiplexer 244 receives a plurality of instruction fetch addresses from the corresponding plurality of program counters 222. Each of the program counters 222 stores a current instruction fetch address for a different program thread. The embodiment of FIG. 2 illustrates four different program counters 222 associated with four different threads. The multiplexer 244 selects one of the four program counters 222 based on a selection input provided by the scheduler 216. In one embodiment, the various threads executing on the microprocessor 100 share the fetch unit 204.

The microprocessor 100 also includes a decode unit 206, coupled to the fetch unit 204, for decoding program instructions fetched by the fetch unit 204, such as MFTR/MTTR 300/400 instructions. The decode unit 206 decodes the opcode, operand, and other fields of the instructions. In one embodiment, the various threads executing on the microprocessor 100 share the decode unit 206.

The microprocessor 100 also includes execution units 212 for executing instructions. The execution units 112 may include but are not limited to one or more integer units for performing integer arithmetic, Boolean operations, shift operations, rotate operations, and the like; floating point units for performing floating point operations; load/store units for performing memory accesses and in particular accesses to a data cache 242 coupled to the execution units 212; and a branch resolution unit for resolving the outcome and target address of branch instructions. In one embodiment, the data cache 242 includes a translation lookaside buffer for caching physical to virtual memory page translations. In addition to the operands received from the data cache 242, the execution units 212 also receive operands from registers of the general purpose register sets 224. In particular, an execution unit 212 receives operands from a register set 224 of the thread context 104 allocated to the thread to which the instruction belongs. A multiplexer 248 selects operands from the appropriate register set 224 for provision to the execution units 212. In addition, the multiplexer 248 receives data from each of the other per-thread contexts 226 and program counters 222, for selective provision to the execution units 212 based on the thread context 104 of the instruction being executed by the execution unit 212. In one embodiment, the various execution units 212 may concurrently execute instructions from multiple concurrent threads.

The microprocessor 100 also includes an instruction issue unit 208, coupled to the scheduler 216 and coupled between the decode unit 206 and the execution units 212, for issuing instructions to the execution units 212 as instructed by the scheduler 216 and in response to information about the instructions decoded by the decode unit 206. In particular, the instruction issue unit 208 insures that instructions are not issued to the execution units 212 if they have data dependencies on other instructions previously issued to the execution units 212. In one embodiment, an instruction queue is imposed between the decode unit 206 and the instruction issue unit 208 for buffering instructions awaiting issue to the execution units 212 for reducing the likelihood of starvation of the execution units 212. In one embodiment, the various threads executing on the microprocessor 100 share the instruction issue unit 208.

The microprocessor 100 also includes a write-back unit 214, coupled to the execution units 212, for writing back results of instructions into the general purpose register sets 224, program counters 222, and other thread contexts 226. A demultiplexer 246 receives the instruction result from the write-back unit 214 and stores the instruction result into the appropriate register set 224, program counters 222, and other thread contexts 226 associated with the instruction's thread. The instruction results are also provided for storage into the VPE contexts 106 and the VMP context 108.

Figure 3A:
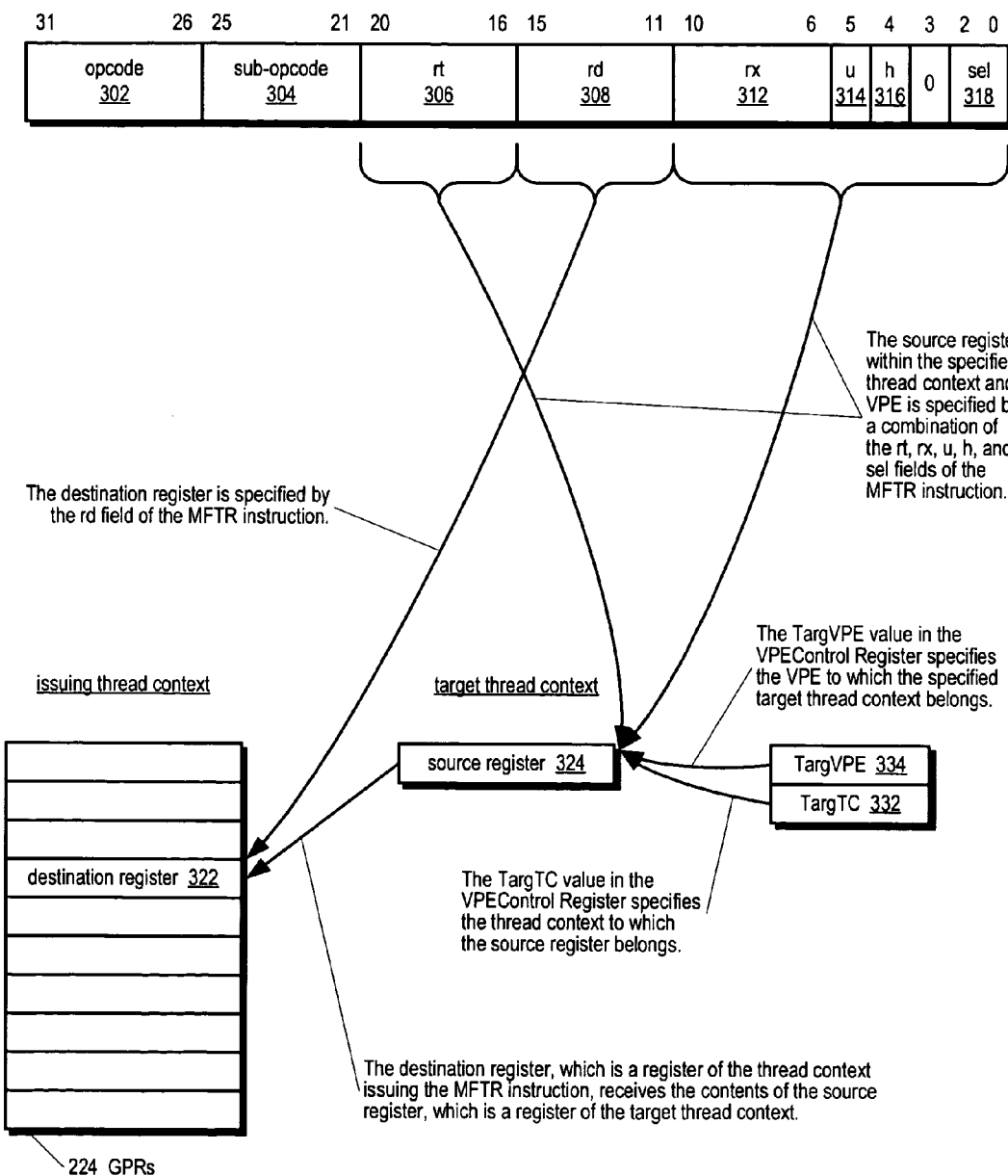
FIG. 3 is a block diagram illustrating an MFTR instruction executed by the microprocessor of FIG. 1 according to the present invention.

Referring now to FIG. 3, a block diagram illustrating an MFTR instruction 300 executed by the microprocessor 100 of FIG. 1 according to the present invention is shown. FIG. 3 comprises FIG. 3A illustrating the format and function of the MFTR instruction 300, and FIG. 3B illustrating a table 350 specifying selection of the MFTR instruction 300 source register 324 based on its operand values. The mnemonic for the MFTR instruction 300 is MFTR rt, rd, u, sel, h as shown. FIG. 3 illustrates the various fields of the MFTR instruction 300. Bits 26-31 are an opcode field 302 and bits 21-25 are a subopcode field 304. In one embodiment, the opcode field 302 indicates the instruction is a COP0 type instruction within the MIPS ISA, and the subopcode field 304 indicates the function is an MFTR instruction. Hence, the decode unit 206 of FIG. 2 examines the opcode field 302 and the subopcode field 304 to determine the instruction is an MFTR instruction 300. Bit 3 is reserved as zero. As shown in FIG. 3, the MFTR instruction 300 instructs the microprocessor 100 to copy the contents of a source register 324 of a target thread context 104 to a destination register 322 of an issuing thread context 104.

Bits 11-15 are an rd field 308, which specifies an rd register 322, or destination register 322, within the general purpose register set 224 of FIG. 2 of the thread context 104 from which the MFTR instruction 300 is issued, referred to herein as the issuing thread context. In one embodiment, the destination register 322 is one of 32 general purpose registers of the MIPS ISA.

Bits 16-20, 6-10, 5, 4, and 2-0 are an rt field 306, rx field 312, u field 314, h 316, and sel field 318, respectively, which collectively are used to specify a source register 324 of a thread context 104 distinct from the issuing thread context, referred to herein as the target thread context 104. The use of the rt field 306, rx field 312, u field 314, h field 316, and sel field 318 to specify the source register 324 is described in detail in table 350 of FIG. 3B.

Figure 6:
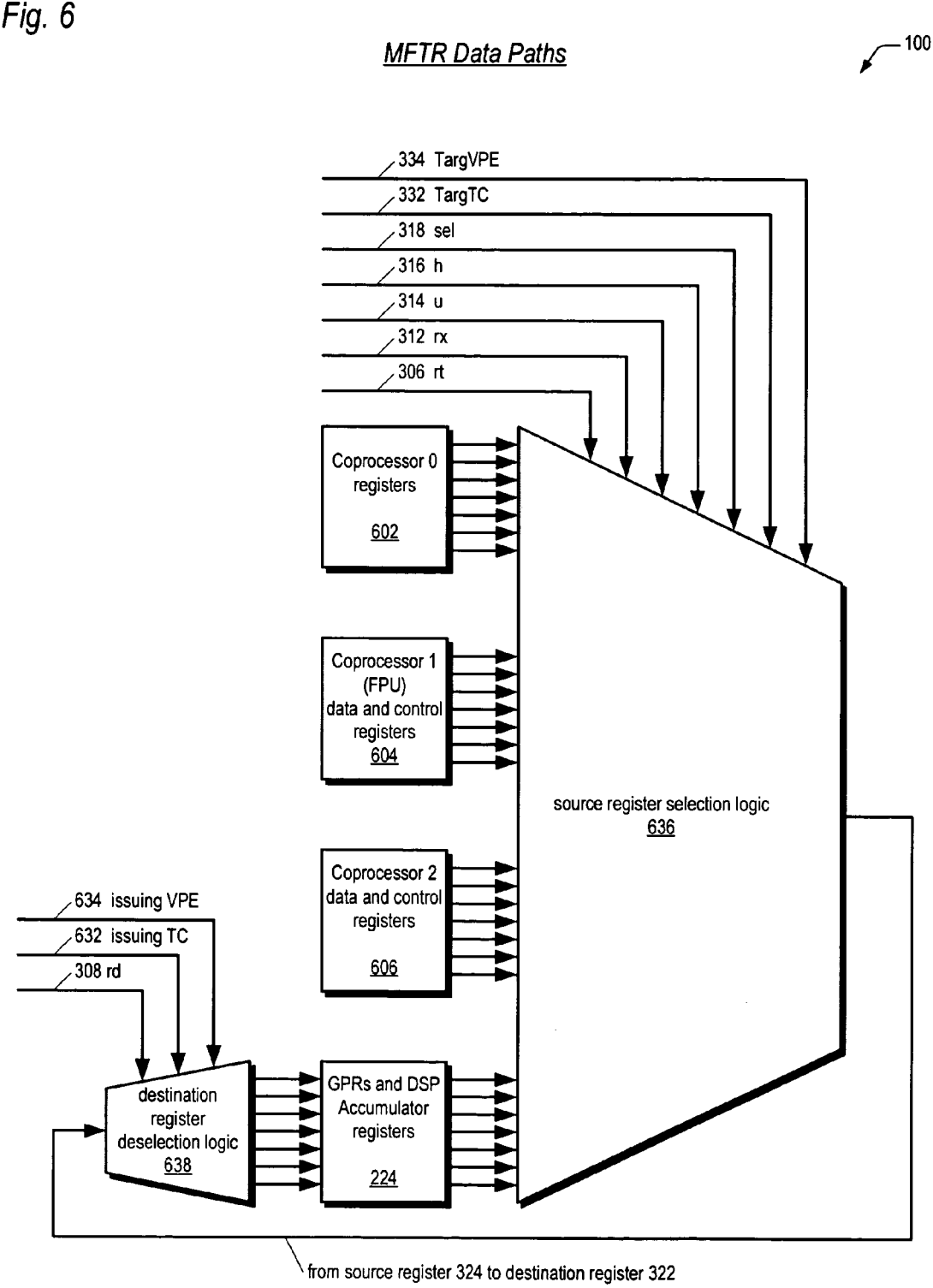
FIG. 6 is a block diagram illustrating data paths of the microprocessor for performing the MFTR instruction according to the present invention.
Figure 8:
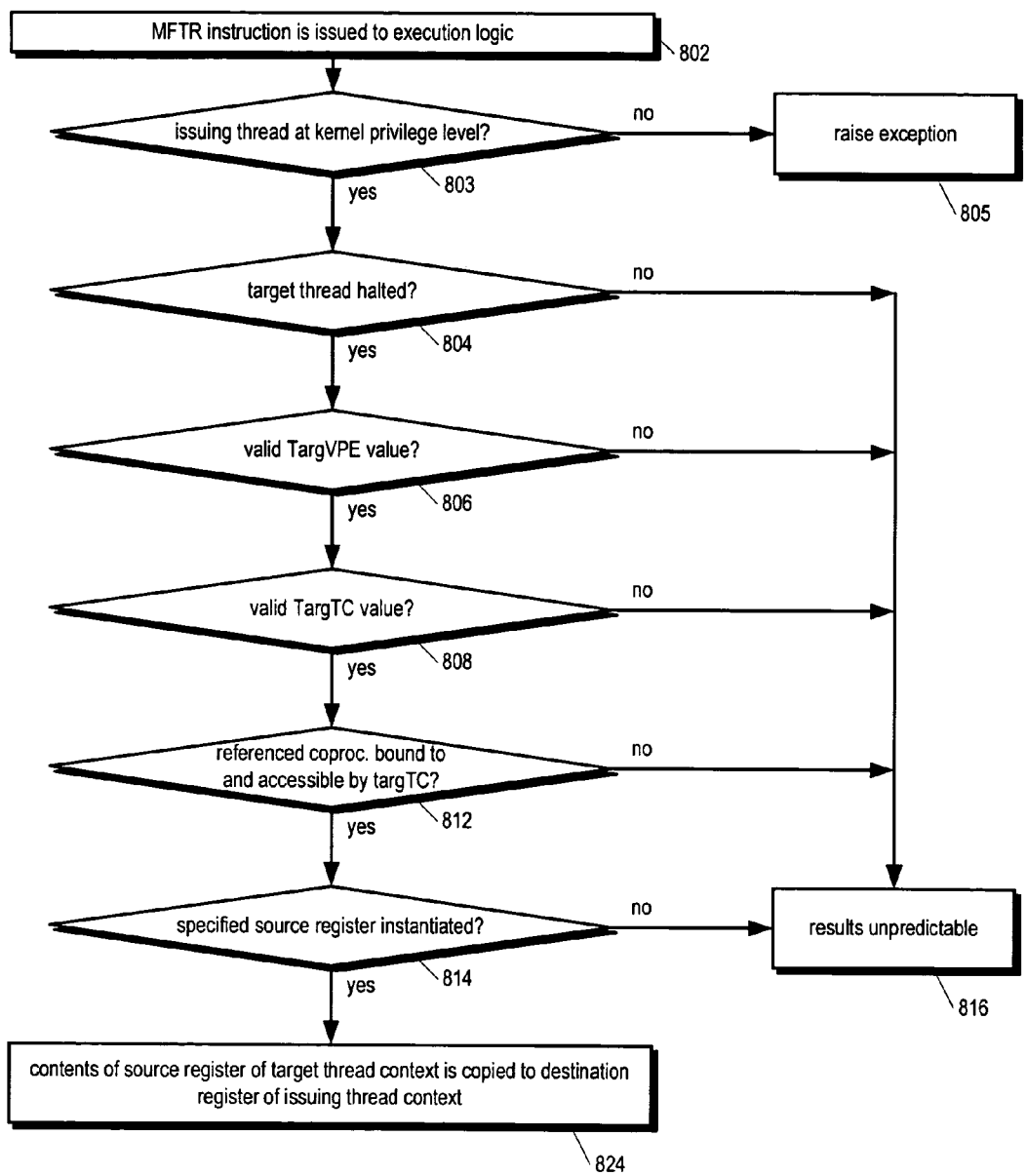
FIG. 8 is a flowchart illustrating operation of the microprocessor to execute the MFTR instruction according to the present invention.

In one embodiment, the microprocessor 100 includes one or more processor control coprocessors, referred to in the MIPS PRA as Coprocessor 0, or CP0, or Cop0, denoted 602 in FIGS. 6 and 8, which is generally used to perform various microprocessor 100 configuration and control functions, such as cache control, exception control, memory management unit control, and particularly multithreading control and configuration. As shown in Table 350, a u field 314 value of 0 selects one of the CP0 registers as the MFTR instruction 300 source register 324. Table 500 of FIG. 5A illustrates the particular rt field 306 (or rd 308 in the case of MTTR 400) and sel field 318 values used to select the various multithreading-related CP0 registers. In one embodiment, as shown in Table 350, a u field 314 value of 1 and a sel field 318 value of 0 selects one of the general purpose registers 224 of FIG. 2, selected by the rt field 306 value, as the MFTR instruction 300 source register 324. In one embodiment, the microprocessor 100 includes a digital signal processor (DSP) arithmetic unit or multiplier for performing common DSP-related arithmetic operations, and each thread context 104 includes four accumulators for storing the TC-specific results of the arithmetic operations and a DSPControl register of the DSP accumulators, denoted 224 in FIGS. 6 and 8. A u field 314 value of 1 and a sel field 318 value of 1 selects as the MFTR instruction 300 source register 324 one of the DSP accumulator registers or the DSPControl register, selected by the rt field 306 value, as shown. In one embodiment, the microprocessor 100 includes one or more floating point or multimedia coprocessors, referred to in the MIPS PRA as Coprocessor 1, or CP1, or Cop1, denoted 604 in FIGS. 6 and 8. As shown in Table 350, a u field 314 value of 1 and a sel field 318 value of 2 selects as the MFTR instruction 300 source register 324 one of the floating point unit data registers (FPR) selected by the rt field 306 value; furthermore, a sel field 318 value of 3 selects as the MFTR instruction 300 source register 324 one of the floating point unit control registers (FPCR) selected by the rt field 306 value. In one embodiment, the microprocessor 100 includes one or more implementation-specific coprocessors, referred to in the MIPS PRA as Coprocessor 2, or CP2, or Cop2, denoted 606 in FIGS. 6 and 8. As shown in Table 350, a u field 314 value of 1 and a sel field 318 value of 4 selects as the MFTR instruction 300 source register 324 one of the CP2 data registers (Cop2 Data) selected by the concatenation of the rx field 312 value and the rt field 306 value; furthermore, a sel field 318 value of 5 selects as the MFTR instruction 300 source register 324 one of the CP2 control registers (Cop2 Control) selected by the concatenation of the rx field 312 value and the rt field 306 value.

In one embodiment, if the precision of the source register 324 is less than the precision of the destination register 322, the value is sign-extended. If the source register 324 is greater precision than the destination register 322, the high-order half of the source register 324 is copied if the h bit 316 is set and the low-order half of the source register 324 is copied if the h bit 316 is clear.

The source register 324 is further specified by a TargVPE 334 operand and a TargTC operand 332. The TargVPE 334 operand specifies which of the VPEs 102 of the microprocessor 100 contains the target thread context 104. The TargTC 332 operand specifies the target thread context 104 containing the source register 324 within the specified target VPE 102. In one embodiment, the TargVPE 334 operand and TargTC operand 332 are stored in the VPEControl Register 502 of FIG. 5C. In another embodiment, the TargVPE 334 operand and TargTC operand 332 are included in fields of the MFTR instruction 300 or MTTR instruction 400 itself. In another embodiment, the TargVPE 334 operand and TargTC operand 332 are stored in one or more of the general purpose registers 224 specified by a field of the MFTR instruction 300. Similarly, in other embodiments, the various fields of the MFTR/MTTR instructions 300/400, such as rt field 306, rd field 208, rx field 312, u field 314, h field 316, and sel field 318, may be specified in a manner other than within fields of the instruction itself, such as in registers or memory.

Referring now to FIG. 4, a block diagram illustrating an MTTR instruction 400 executed by the microprocessor 100 of FIG. 1 according to the present invention is shown. FIG. 4 comprises FIG. 4A illustrating the format and function of the MTTR instruction 400, and FIG. 4B illustrating a table 450 specifying selection of the MTTR instruction 400 destination register 422 based on its operand values. The mnemonic for the MTTR instruction 400 is MTTR rt, rd, u, sel, h as shown. The various fields of the MTTR instruction 400 are identical to the fields of the MFTR instruction 300, except that the value of the sub-opcode field 404 is different, and the use of the rt field 306 and rd field 308 is reversed, i.e., the rt field 306 is used by the MTTR instruction 400 to select the source register 424 and the rd field 308 is used—along with the rx 312, u 314, h 316, and sel 318 fields—to select the destination register 422 within the thread context 104 and VPE 102 specified by the TargTC 332 and TargVPE 334 operands, respectively, as shown in FIG. 4. As shown in FIG. 4, the MTTR instruction 400 instructs the microprocessor 100 to copy the contents of a source register 424 of the issuing thread context 104 to a destination register 424 of the target thread context 104. In one embodiment, if the destination register 424 is greater precision than the source register 424, the contents of the source register 424 is copied to the high-order half of the destination register 422 if the h bit 316 is set and to the low-order half of the destination register 422 if the h bit 316 is clear, and the value is not sign-extended.

Referring now to FIG. 5, a series of block diagrams illustrating various multithreading-related registers of the microprocessor 100 of FIG. 1 according to one embodiment of the present invention is shown. FIG. 5 comprises FIG. 5A-5L. In one embodiment, the registers of FIG. 5 are comprised in CP0 602 of FIG. 6 and 8, and FIG. 5A is a table 500 indicating the particular rt field 306 (or rd 308 in the case of MTTR 400) and sel field 318 values used to select the various multithreading-related CP0 registers 602. As indicated in table 500, some of the registers are included in the VMP context 108 of FIG. 1 (i.e., are per-microprocessor 100 registers), some of the registers are included in the VPE contexts 106 of FIG. 1 (i.e., are per-VPE 102 registers), and some of the registers are included in the thread contexts 104 of FIG. 1 (i.e., are per-thread context 104 registers). Most of FIGS. 5B-5L include an illustration of the fields of the each of the multithreading registers and a table describing the various fields. Fields of particular relevance to the MFTR/MTTR 300/400 instructions are discussed in more detail herein. Each of the registers illustrated in FIG. 5 of one thread context (i.e., the target thread context 104) may be selectively read and/or written by another thread context 104 (i.e., the issuing thread context 104) that executes an MFTR 300 or MTTR 400 instruction, respectively, depending upon the readability or writeability of the particular register or bits thereof.

The EVP bit 513 of FIG. 5B controls whether the microprocessor 100 is executing as a virtual multiprocessor, i.e., if multiple VPEs 102 may concurrently fetch and issue instructions from distinct threads of execution. The PVPE field 524 of FIG. 5C specifies the total number of VPEs 102, i.e., the total number of VPE contexts 106, instantiated in the microprocessor 100. In the embodiment of FIG. 5, up to sixteen VPEs 102 may be instantiated in the microprocessor 100. The PTC field 525 of FIG. 5C specifies the total number of thread contexts 104 instantiated in the microprocessor 100. In the embodiment of FIG. 5, up to 256 thread contexts 104 may be instantiated in the microprocessor 100. The CurTC field 542 of FIG. 5E enables an issuing thread context 104 to determine the last thread context 104 to have issued an instruction. The TE bit 543 of FIG. 5E controls whether multithreading is enabled or disabled. In one embodiment, the effect of clearing the EVP bit 513 and TE bit 543 may not be instantaneous; consequently the operating system should execute a hazard barrier instruction to insure that all VPEs 102 and thread contexts 104, respectively, have been quiesced.

As discussed above, the TargVPE field 334 and TargTC field 332 of FIG. 5E are used by an issuing thread context 104 to specify the VPE 102 and thread context 104, respectively, that contains the source register 324 in the case of an MFTR instruction 300 or the destination register 422 in the case of an MTTR instruction 400. In one embodiment, the issuing thread context 104 executes an instruction prior to the MFTR/MTTR instruction 300/400 to populate the TargVPE 334 and TargTC 332 fields of the VPEControl Register 504. In one embodiment, a single TargTC 334 value per VPE 102 is sufficient since multithreading must be disabled on the VPE 102 issuing the MFTR/MTTR 300/400 instruction; hence, none of the other thread contexts 104 of the VPE 102 may be using the TargTC 334 field of the VPEControl Register 504 of the issuing VPE 102. Similarly, a single TargVPE 332 value per microprocessor 100 is sufficient since multi-VPE operation must be disabled on the microprocessor 100 if an MFTR/MTTR 300/400 instruction is issued wherein the target VPE 102 is different from the issuing VPE 102; hence, none of the other thread contexts 104 of the microprocessor 100 may be using the VPEControl Register 504. In an alternate embodiment, the TargTC 334 value and/or TargVPE 332 value may be provided within a field of the MFTR/MTTR 300/400 instructions.

The MVP bit 553 of FIG. 5F indicates whether the particular VPE 102 is designated to configure the other VPEs 102 of the microprocessor 100, in particular using the MFTR/MTTR instructions 300/400. For a detailed description of the use of the YQMask Register 591 of FIG. 5H in conjunction with the YIELD instruction of the microprocessor 100, the reader is referred to the above-referenced related U.S. Patent Application entitled INTEGRATED MECHANISM FOR SUSPENSION AND DEALLOCATION OF COMPUTATIONAL THREADS OF EXECUTION IN A PROCESSOR (Docket No. MIPS.0189-01US) filed concurrently herewith.

The VPESchedule Register 592 of FIG. 5H stores a Scheduler Hint value 529 whose interpretation is dependent upon the particular implementation of the scheduler 216 of FIG. 2. In one embodiment, the Scheduler Hint value 529 encodes a description of the overall requested issue bandwidth for the associated VPE 102. In one embodiment, the Scheduler Hint value 529 encodes a priority level of the associated VPE 102. The VPESchedule Register 592 and the TCSchedule Register 596 of FIG. 5L collectively create a hierarchy for instructing the microprocessor 100 how to allocate instruction issue bandwidth. The VPESchedule Registers 592 of the microprocessor 100 assign bandwidth to VPEs 102 as a proportion of the total issue bandwidth available on the microprocessor 100, and the TCSchedule Registers 596 assign bandwidth to their respective thread contexts 104 as a function of instruction issue bandwidth available to the VPE 102 containing the thread context 104. The VPEScheFBack Register 593 stores a Scheduler Feedback value 539 that enables the scheduler 216 to provide information to threads. In one embodiment, the scheduler 216 communicates the number of instructions retired in the instruction streams associated with the thread contexts 104 of the VPE 102 since the last time cleared by software. The TC ScheFBack Register 597 of FIG. 5L performs a similar function, but on a per-thread context 104 basis, rather than on a per-VPE 102 basis. The TCContext Register 595 of FIG. 5L is a read/write register usable by the operating system as a pointer to a thread context-specific storage area in memory, such as a thread context control block. The TCContext Register 595 may be used by the operating system, for example, to save and restore state of a thread context 104 when the program thread associated with the thread context 104 must be swapped out for use by another program thread.

The A bit 588 of the TCStatus Register 508 of FIG. 5J indicates whether a thread context 104 is activated or free. A free thread context 104 has no valid content and cannot be scheduled to issue instructions. An activated thread context 104 will be scheduled to fetch and issue instructions from its program counter 222 according to the scheduler's 216 scheduling policy. Only activated thread contexts 104 may be scheduled by the scheduler 216. Only free thread contexts 104 may be allocated to create new threads. Allocation and deallocation of thread contexts 104 may be performed explicitly by privileged software, such as the operating system, or automatically via FORK and YIELD instructions which can be executed in user mode. Only thread contexts 104 which have been explicitly designated as Dynamically Allocatable, as indicated by the DA bit 587 of FIG. 5J, may be allocated or deallocated by FORK and YIELD instructions.

The RNST bits 582 of the TCStatus Register 508 indicate the state of the thread context 104, namely whether the thread context 104 is running or blocked, and if blocked the reason for blockage. The RNST 582 value is only stable when read by an MFTR instruction 300 if the target thread context 104 is in a halted state, which is described below; otherwise, the RNST 582 value may change asynchronously and unpredictably. If the RNST 582 value is zero, the thread context 104 is running, whereas if the RNST 582 value is greater than zero, the thread context 104 is blocked waiting on an event. When a thread context 104 is in the running state, the microprocessor 100 will fetch and issue instructions from the thread of execution specified by the thread context 104 program counter 222 according to the scheduler 216 scheduling policy. Any or all running thread contexts 104 may have instructions in the microprocessor 100 pipeline at a given point of time. A blocked thread context 104 has issued an instruction which performs an explicit synchronization that has not yet been satisfied. While a running, activated thread context 104 may be stalled due to functional unit delays, memory load dependencies, or scheduling rules, for example, its instruction stream will advance on its own. In contrast, the instruction stream of a blocked thread context 104 cannot advance without a change in the state of the microprocessor 100 being effected by another thread or by an external event, and consequently may remain blocked for an unbounded period of time.

Independently of whether a thread context 104 is free or activated, a thread context 104 may be halted, i.e., the H bit 599 of the TCHalt Register 509 of FIG. 5K is set. A halted thread context 104 is inhibited from being allocated by a FORK instruction, even if free, and inhibited from fetching and issuing instructions, even if activated. Only a thread context 104 in a halted state is guaranteed to be stable as seen by other thread contexts 104, i.e., when examined by an MFTR instruction 300. Multithreaded execution may be temporarily inhibited on a VPE 102 due to exceptions or explicit software interventions, but activated thread contexts 104 that are inhibited in such cases are considered to be suspended, rather than implicitly halted. A suspended thread context 104 is inhibited from any action which might cause exceptions or otherwise change global VPE 102 privileged resource state, but unlike a halted thread, a suspended thread context 104 may still have instructions active in the pipeline; consequently, the suspended thread context 104, including general purpose registers 224 values, may still be unstable; therefore, the thread context 104 should not be examined by an MFTR instruction 300 until the thread context 104 is halted. In one embodiment, the effect of clearing the H bit 599 may not be instantaneous; consequently the operating system should execute a hazard barrier instruction to insure that the target thread context has been quiesced.

When a thread context 104 is in a halted state, the TCPC Register 594 of FIG. 5K contains the address of the instruction at which the microprocessor 100 will resume execution of the thread context 104 when the thread context 104 is no longer halted, i.e., when the H bit 599 of the TCHalt Register 509 is clear. In one embodiment, the TCPC Register 594 should be read only when the thread context 104 is halted to obtain a valid value. In one embodiment, in the case of branch and jump instructions with architectural delay slots, the TCPC Register 594 value will advance beyond the address of the branch or jump instruction only after the instruction in the delay slot has been retired. If the thread context 104 is halted between the execution of a branch and the associated delay slot instruction, the branch delay slot is indicated by the TDS bit 584 of the TCStatus Register 508.

The MFTR/MTTR instructions 300/400 described herein may be used in a variety of applications, including, but not limited to, the following. First, the MFTR/MTTR instructions 300/400 may be used to initialize the microprocessor 100. For example, software that executes when the microprocessor 100 is reset may perform global initializations, such as initializing thread contexts, which would otherwise require dedicated hardware within the microprocessor 100 to reset the thread contexts to required initial values. Because the thread context being initialized, or modified generally as in other uses described herein, may be different from the thread context associated with the instruction stream including the MFTR/MTTR instructions 300/400, a single thread of initialization code, such as boot code or operating system initialization code, may perform the initializations needed for all of the other thread contexts of the microprocessor 100, rather than requiring each thread context to initialize itself. In one embodiment, the operating system may execute a series of MTTR instructions 400 to transfer values to a target thread context 104, which is particularly efficient if the number of values to be transferred is relatively small. However, in another embodiment, particularly in which a large number of values are to be written to the target thread context 104, the operating system writes the memory address of a cooperative subroutine directly into the TCPC Register 594 of the target thread context 104 of the target VPE 102 and causes the target thread context 104 to run, thereby skipping the need to cause an exception on the target thread context 104 to transfer the values.

Second, the MFTR/MTTR instructions 300/400 may be used by an operating system to perform a task switch, or process switch, more efficiently than would be possible without the benefit of the MFTR/MTTR instructions 300/400. For example, assume a first task, or program, or process, currently running on the microprocessor 100 consists of five distinct instruction streams executing in five respective thread contexts. Assume a timer exception is raised, the operating system's exception handler is invoked, and the exception handler decides it is time to switch from running the first task to running a second task, which consists of seven distinct instruction streams, and only two thread contexts are free for allocation. The exception handler is executing in its own thread context, which may or may not be one of the five thread contexts of the first task. In order to perform the task switch, the five thread contexts of the first task must be saved to memory, and the seven contexts of the second task must be restored from memory into the five thread contexts of the first task and the two free thread contexts. In a conventional processor, i.e., without the benefit of the MFTR/MTTR instructions 300/400, the exception handler must cause each of the five thread contexts of the first task to take an exception to save its state and restore five of the thread contexts of the second task, and cause each of the two free thread contexts to take an exception to restore the remaining two thread contexts of the second task. This is because the exception handler running on a conventional processor can only access its own thread context, not the other thread contexts of the conventional processor. However, with the benefit of the MFTR/MTTR instructions 300/400, the exception handler executing on the present microprocessor 100 may save the state of each of the first task's thread contexts and then restore the state of each of the second task's thread contexts from within the single exception handler thread context.

Third, the MFTR/MTTR instructions 300/400 may be used by a debugger to debug multithreaded programs. When a debug exception is raised on the microprocessor 100, a debug exception handler is invoked, which executes in one of the various thread contexts of the microprocessor 100. The programmer debugging the multithreaded program will want to see the context, e.g., the register values, of each thread of the program being debugged. In a conventional processor, i.e., without the benefit of the MFTR/MTTR instructions 300/400, the debug exception handler must cause each thread context of the program to take an exception so that the respective exception handlers may read the respective thread context values and provide them to the programmer for debugging. However, the MFTR/MTTR instructions 300/400 of the present microprocessor 100 enable the debug exception handler from its own thread context to read the thread context values from all of the thread contexts of the program.

Fourth, the MFTR/MTTR instructions 300/400 may be used by the operating system to perform various other multithreading-related thread management operations. For example, in one embodiment, the microprocessor 100 includes a FORK instruction that creates a new thread by allocating a free thread context and scheduling the new thread context for execution in a single instruction. If no free dynamically allocatable thread contexts are available, a thread overflow exception is raised. The thread overflow exception handler executing in its own thread context on the present microprocessor 100 may use the MFTR/MTTR instructions 300/400 to modify the state of other currently active thread contexts to facilitate the subsequent availability of a thread context when the FORK instruction is retried. For another example, the operating system may employ the MFTR/MTTR instructions 300/400 to migrate threads from one thread context to another, such as to perform load balancing. For yet another example, the operating system may employ the MFTR/MTTR instructions 300/400 to allocate and initialize a thread context 104, as described below with respect to FIG. 12. As stated above, the uses of the MFTR/MTTR instructions 300/400 just described are given for illustration and are not an exhaustive list of the potential uses of the MFTR/MTTR instructions 300/400.

Referring now to FIG. 6, a block diagram illustrating data paths of the microprocessor 100 for performing the MFTR instruction 300 according to the present invention is shown. The microprocessor 100 includes selection logic 636 that receives the contents of each of the registers of Coprocessor 0 602, Coprocessor 1 604, Coprocessor 2 606, and the general purpose and DSP accumulator registers 224 of FIG. 2 and selects the source register 324 contents, which is one of the register contents from the target thread context 104, for provision to deselection logic 638 based on values of the rt 306 operand, the rx 312 operand, the u 314 operand, the h 316 operand, and the sel 318 operand of the MFTR instruction 300, as well as the TargTC 332 operand and the TargVPE 334 operand. The deselection logic 638 receives the source register 324 contents selected by the selection logic 636 and writes the selected contents into the destination register 322, which is one of the general purpose registers 224 of the issuing thread context 104, based on the value of the rd 308 operand of the MFTR instruction 300, as well as signals 632 and 634 indicating the issuing VPE 102 and issuing thread context 104, respectively.

Figure 7:
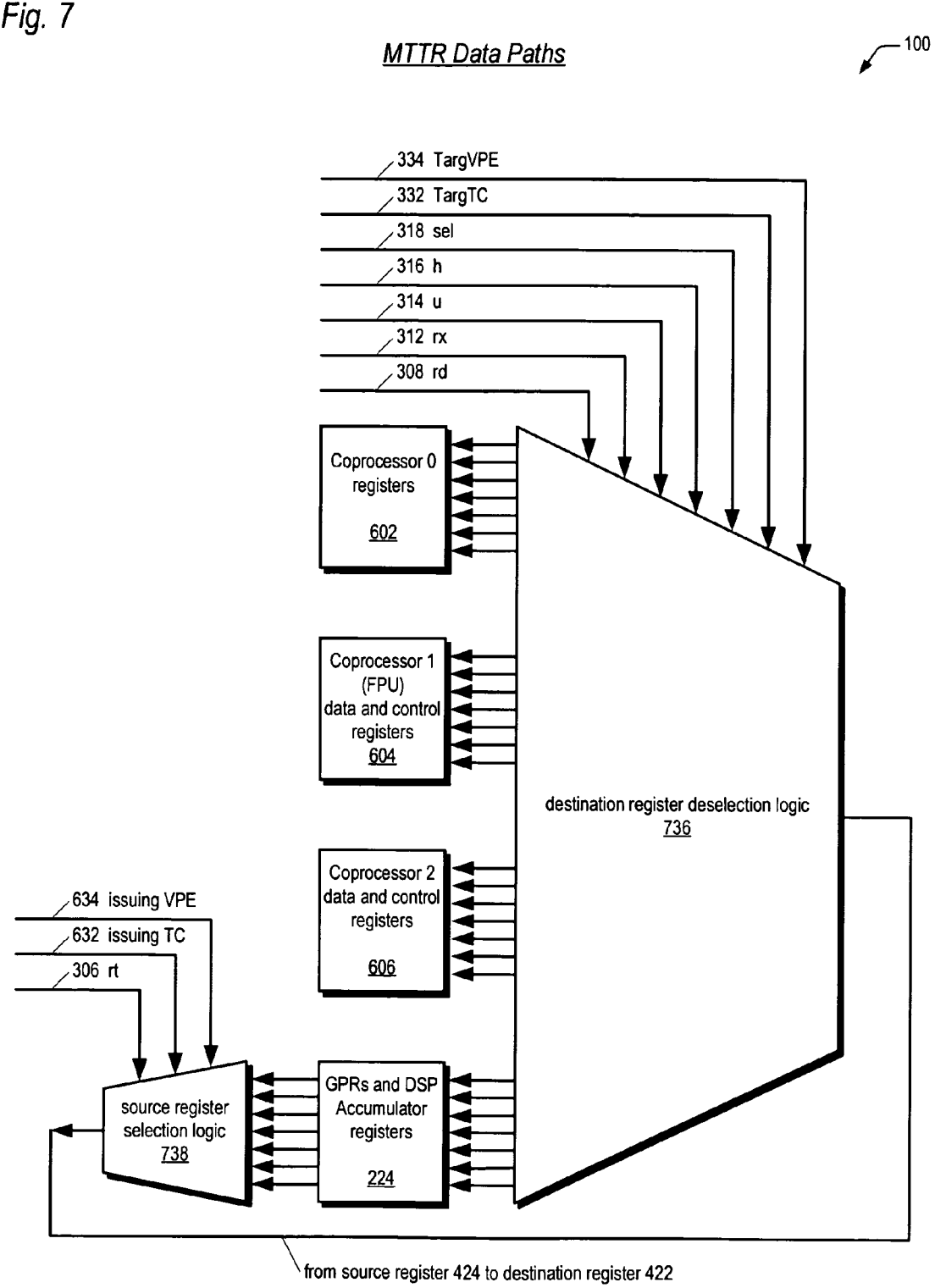
FIG. 7 is a block diagram illustrating data paths of the microprocessor for performing the MTTR instruction according to the present invention.

Referring now to FIG. 7, a block diagram illustrating data paths of the microprocessor 100 for performing the MTTR instruction 400 according to the present invention is shown. The microprocessor 100 includes selection logic 738 that receives the contents of each of the general purpose registers 224 of the issuing thread context 104 and selects the source register 424, which is one of the register contents from the issuing thread context 104, for provision to deselection logic 736 based on the value of the rt 306 operand of the MTTR instruction 400, as well as signals 632 and 634 indicating the issuing VPE 102 and issuing thread context 104, respectively. The deselection logic 736 receives the source register 424 contents selected by the selection logic 738 and writes the selected contents into the destination register 422, which is one of the registers of Coprocessor 0 602, Coprocessor 1 604, Coprocessor 2 606, or the general purpose and DSP accumulator registers 224 of FIG. 2, based on values of the rd 308 operand, the rx 312 operand, the u 314 operand, the h 316 operand, and the sel 318 operand of the MTTR instruction 400, as well as the TargTC 332 operand and the TargVPE 334 operand. In one embodiment, the selection and de-selection logic of FIGS. 6 and 7 may comprise a hierarchy of multiplexers, demultiplexers, data buses, and control logic for generating a plurality of bank and register selectors to control the multiplexers and demultiplexers for selecting the appropriate values from the specified register for provision on the data buses. In one embodiment, the data paths may also include intermediate registers for storing the values transferred between the issuing and target thread contexts over multiple clock cycles.

Referring now to FIG. 8, a flowchart illustrating operation of the microprocessor 100 to execute the MFTR instruction 300 according to the present invention is shown. Flow begins a block 802.

At block 802, the instruction issuer 208 of FIG. 2 issues an MFTR instruction 300 to the execution units 212. Flow proceeds to decision block 803.

At decision block 803, the execution unit 212 examines the TKSU bits 589 of the TCStatus Register 508 to determine whether the privilege level of the issuing thread context 104 is at kernel privilege level. If so, flow proceeds to decision block 804; otherwise, flow proceeds to block 805.

At block 805, the execution unit 212 raises an exception to the MFTR instruction 300 since the issuing thread context 104 does not have sufficient privilege level to execute the MFTR instruction 300. Flow ends at block 805.

At decision block 804, the execution unit 212 determines whether the target thread context 104 is halted by examining the value of the H bit 599 of the TCHalt Register 509 of FIG. 5K. If the target thread context 104 is halted, flow proceeds to decision block 806; otherwise flow proceeds to block 816.

At decision block 806, the execution unit 212 examines the TargVPE 334 value of the issuing VPE 102 VPEControl Register 504 of FIG. 5E to determine whether the TargVPE 334 value is valid. In one embodiment, the TargVPE value 334 is not valid if multi-VPE execution is enabled, as indicated by a set value in the EVP bit 513 of the MVPControl Register 501 of FIG. 5B, and the issuing VPE 102 is not the target VPE 102. In one embodiment, the TargVPE 334 is not valid if the thread context 104 specified by TargVPE 334 is not instantiated in the microprocessor 100. In one embodiment, TargVPE 334 is not instantiated in the microprocessor 100 if the TargVPE 334 value exceeds the value specified in the PVPE field 524 of the MVPConf0 Register 502 of FIG. 5C. If the TargVPE 334 value is valid, flow proceeds to decision block 808; otherwise, flow proceeds to block 816.

At decision block 808, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F, and the TargTC 332 value is not within the range specified by the MinTC field 554 and MaxTC field 555 in the VPEConf0 Register 505. In one embodiment, the TargTC 332 value is not valid if the thread context 104 specified by TargTC 332 is not instantiated. If the TargTC 332 value is valid, flow proceeds to decision block 812; otherwise, flow proceeds to block 816.

At decision block 812, the execution unit 212 examines the TCU bits 581 in the TCStatus Register 508 of FIG. 5J to determine whether the MFTR instruction 300 references a coprocessor, and if so, whether the coprocessor is bound to and accessible by the target thread context 104 specified by the TargTC 332 value. If the MFTR instruction 300 references a coprocessor, and the coprocessor is not bound to and accessible by the target thread context 104 specified by the TargTC 332 value, flow proceeds to block 816; otherwise, flow proceeds to decision block 814.

At decision block 814, the execution unit 212 determines whether the source register 324 specified by the MFTR instruction 300 is instantiated. If so, flow proceeds to block 824; otherwise, flow proceeds to block 816.

At block 816, the results of the MFTR instruction 300 are unpredictable. That is, the microprocessor 100 attempts to perform block 824; however, the source, destination, and values of the data transfer are unpredictable. Flow ends at block 816.

At block 824, the execution unit 212 copies the contents of the source register 324 of the target thread context 104 to the destination register 322 of the issuing thread context 104. In one embodiment described below with respect to FIG. 11, the microprocessor 100, after reading the source register 324, updates the source register 324 with an update value. In one embodiment, the read/update is performed atomically. In one embodiment, the update value is provided in the GPR 224 specified by the rd field 308 in the MFTR instruction 300. Flow ends at block 824.

Figure 9:
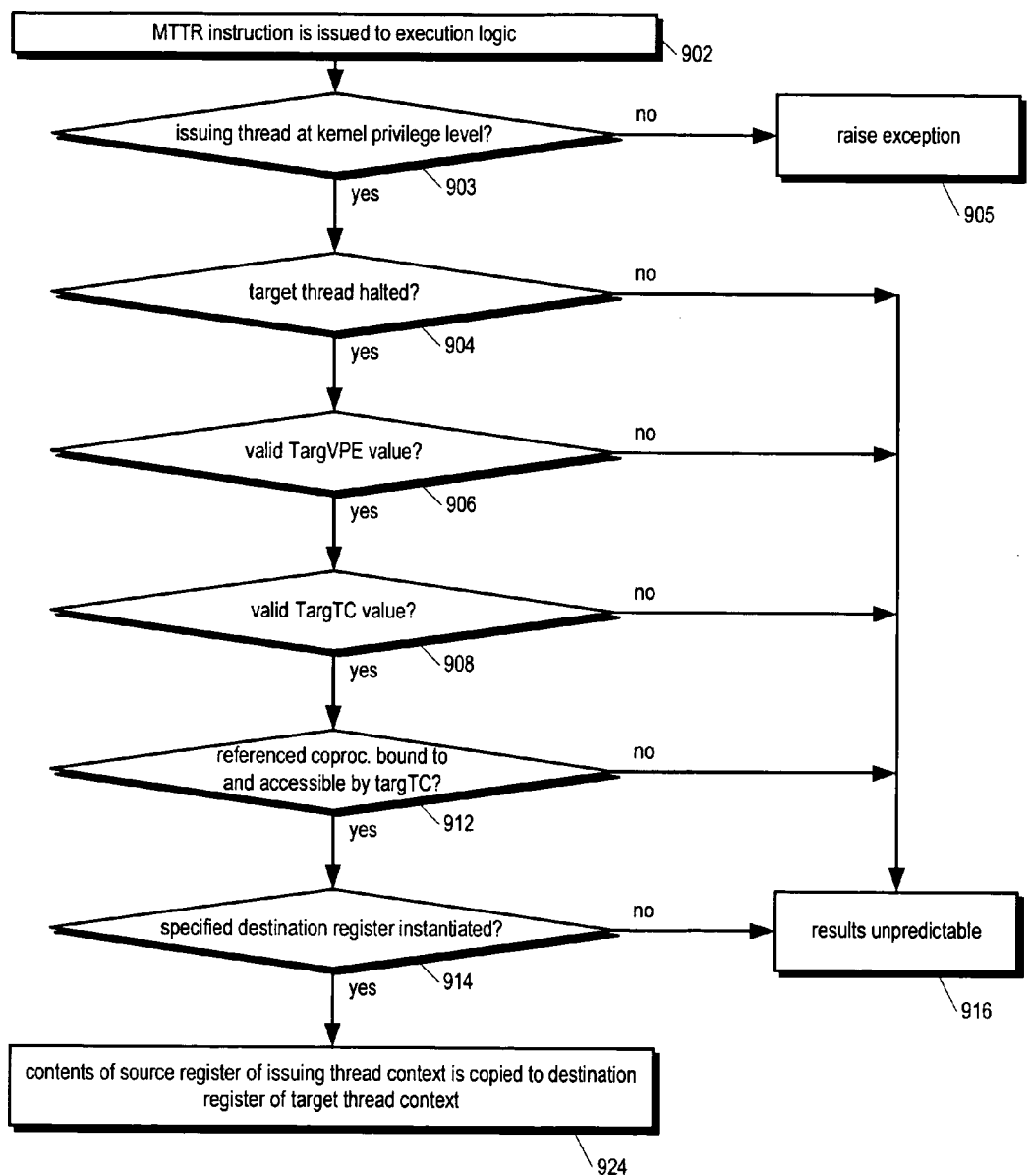
FIG. 9 is a flowchart illustrating operation of the microprocessor to execute the MTTR instruction according to the present invention.

Referring now to FIG. 9, a flowchart illustrating operation of the microprocessor 100 to execute the MTTR instruction 400 according to the present invention is shown. Flow begins a block 902.

At block 902, the instruction issuer 208 of FIG. 2 issues an MTTR instruction 400 to the execution units 212. Flow proceeds to decision block 903.

At decision block 903, the execution unit 212 examines the TKSU bits 589 of the TCStatus Register 508 to determine whether the privilege level of the issuing thread context 104 is at kernel privilege level. If so, flow proceeds to decision block 904; otherwise, flow proceeds to block 905.

At block 905, the execution unit 212 raises an exception to the MTTR instruction 400 since the issuing thread context 104 does not have sufficient privilege level to execute the MTTR instruction 400. Flow ends at block 905.

At decision block 904, the execution unit 212 determines whether the target thread context 104 is halted by examining the value of the H bit 599 of the TCHalt Register 509 of FIG. 5K. If the target thread context 104 is halted, flow proceeds to decision block 906; otherwise flow proceeds to block 916.

At decision block 906, the execution unit 212 examines the TargVPE 334 value of the issuing VPE 102 VPEControl Register 504 of FIG. 5E to determine whether the TargVPE 334 value is valid. In one embodiment, the TargVPE value 334 is not valid if the issuing VPE 102 is not the target VPE 102 and multi-VPE execution is enabled, as indicated by a set value in the EVP bit 513 of the MVPControl Register 501 of FIG. 5B. In one embodiment, the TargVPE 334 is not valid if the thread context 104 specified by TargVPE 334 is not instantiated in the microprocessor 100. In one embodiment, TargVPE 334 is not instantiated in the microprocessor 100 if the TargVPE 334 value exceeds the value specified in the PVPE field 524 of the MVPConf0 Register 502 of FIG. 5C. If the TargVPE 334 value is valid, flow proceeds to decision block 908; otherwise, flow proceeds to block 916.

At decision block 908, the execution unit 212 examines the TargTC 332 value of the issuing VPE 102 VPEControl Register 504 to determine whether the TargTC 332 value is valid. In one embodiment, the TargTC 332 value is not valid if the issuing VPE is not the master VPE 102, as indicated by a clear value in the MVP bit 553 of the VPEConf0 Register 505 of FIG. 5F, and the TargTC 332 value is not within the range specified by the MinTC field 554 and MaxTC field 555 in the VPEConf0 Register 505. In one embodiment, the TargTC 332 value is not valid if the thread context 104 specified by TargTC 332 is not instantiated. If the TargTC 332 value is valid, flow proceeds to decision block 912; otherwise, flow proceeds to block 916.

At decision block 912, the execution unit 212 examines the TCU bits 581 in the TCStatus Register 508 of FIG. 5J to determine whether the MTTR instruction 400 references a coprocessor, and if so, whether the coprocessor is bound to and accessible by the target thread context 104 specified by the TargTC 332 value. If the MTTR instruction 400 references a coprocessor, and the coprocessor is not bound to and accessible by the target thread context 104 specified by the TargTC 332 value, flow proceeds to block 916; otherwise, flow proceeds to decision block 914.

At decision block 914, the execution unit 212 determines whether the destination register 422 specified by the MTTR instruction 400 is instantiated. If so, flow proceeds to block 924; otherwise, flow proceeds to block 916.

At block 916, the results of the MTTR instruction 400 are unpredictable. That is, the microprocessor 100 attempts to perform block 924; however, the source, destination, and values of the data transfer are unpredictable. Flow ends at block 916.

At block 924, the execution unit 212 copies the contents of the source register 424 of the issuing thread context 104 to the destination register 422 of the target thread context 104. Flow ends at block 924.

Figure 10:
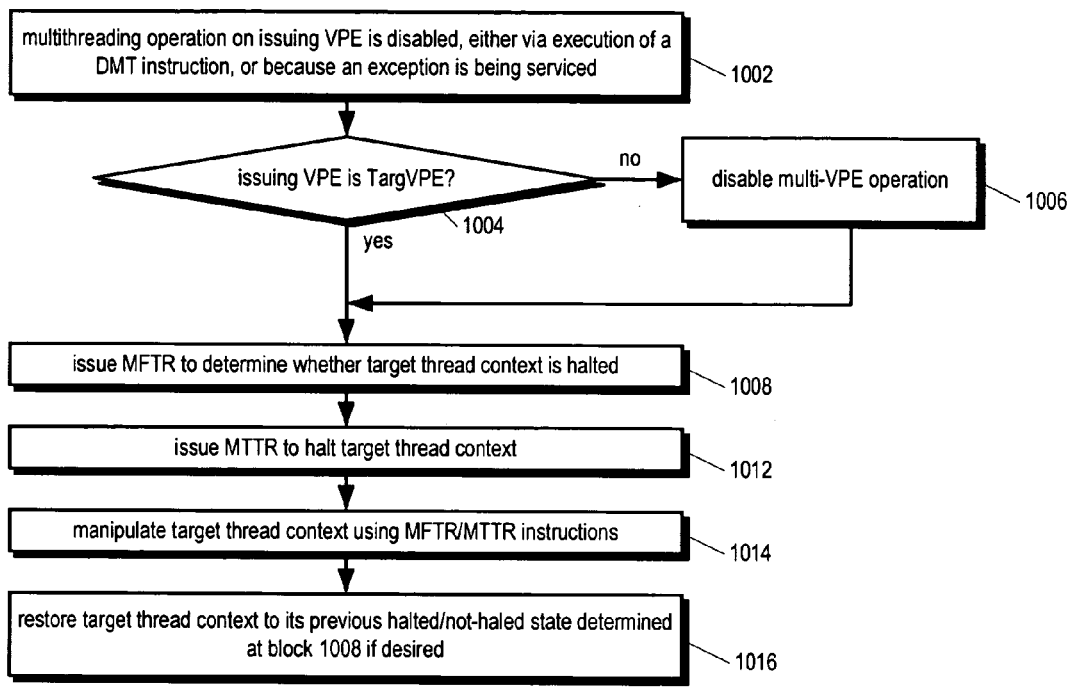
FIG. 10 is a flowchart illustrating use of the MFTR/MTTR instructions to manage thread contexts in the microprocessor of FIG. 1 according to the present invention.

Referring now to FIG. 10, a flowchart illustrating use of the MFTR/MTTR 300/400 instructions to manage thread contexts 104 in the microprocessor 100 of FIG. 1 is shown. Flow begins at block 1002.

At block 1002, multithreading operation on the VPE 102 containing the thread context 104 executing the operating system thread that will manage one or more thread contexts 104, i.e., the issuing VPE 102, is disabled. The multithreading operation may be disabled because an exception was raised and is being serviced by the issuing VPE 102, or because a thread executing on the issuing VPE 102 executed a DMT (Disable MultiThreading) instruction, either of which clears the TE bit 543 in the VPEControl Register 504 of FIG. 5E of the VPE 102. Flow proceeds to decision block 1004.

At decision block 1004, the operating system determines whether the VPE 102 it wants to access, i.e., the TargVPE 334, is the same as the VPE 102 the operating system is executing on. If so, flow proceeds to block 1008; otherwise, flow proceeds to block 1006.

At block 1006, the operating system disables multi-VPE 102 operation by executing a DVPE (Disable multi-VPE operation) instruction to clear the EVP bit 513 of the MVPControl Register 501 of FIG. 5B. The operating system disables multi-VPE 102 operation because, in one embodiment, access to a VPE 102 other than the VPE 102 issuing the MFTR/MTTR instruction 300/400 requires multi-VPE 102 operation to be disabled. Flow proceeds to block 1008.

At block 1008, the operating system executes an MFTR instruction 300 with the TCHalt Register 509 of the target thread context 104 as the source register 324 to determine whether the target thread context 104 is currently halted, i.e., to obtain the current state of the target thread context 104. Flow proceeds to block 1012.

At block 1012, the operating system loads a source register 424 (i.e., one of the general purpose registers 224 of the issuing thread context 104) with a binary one value (corresponding to a set value of the H bit 599) and executes an MTTR instruction 400 with the TCHalt Register 509 of the target thread context 104 as the destination register 422 to halt the target thread context 104. Flow proceeds to block 1014.

At block 1014, the operating system executes one or more MFTR/MTTR 300/400 instructions in order to manipulate the target thread context 104 as desired, including but not limited to performing any of the applications discussed above. Flow proceeds to block 1016.

At block 1016, depending upon the management performed by the operating system, the operating system selectively restores the target thread context 104 halted/not-halted state to its previous halted/not-halted state determined at block 1008. Flow ends at block 1016.

Figure 11:
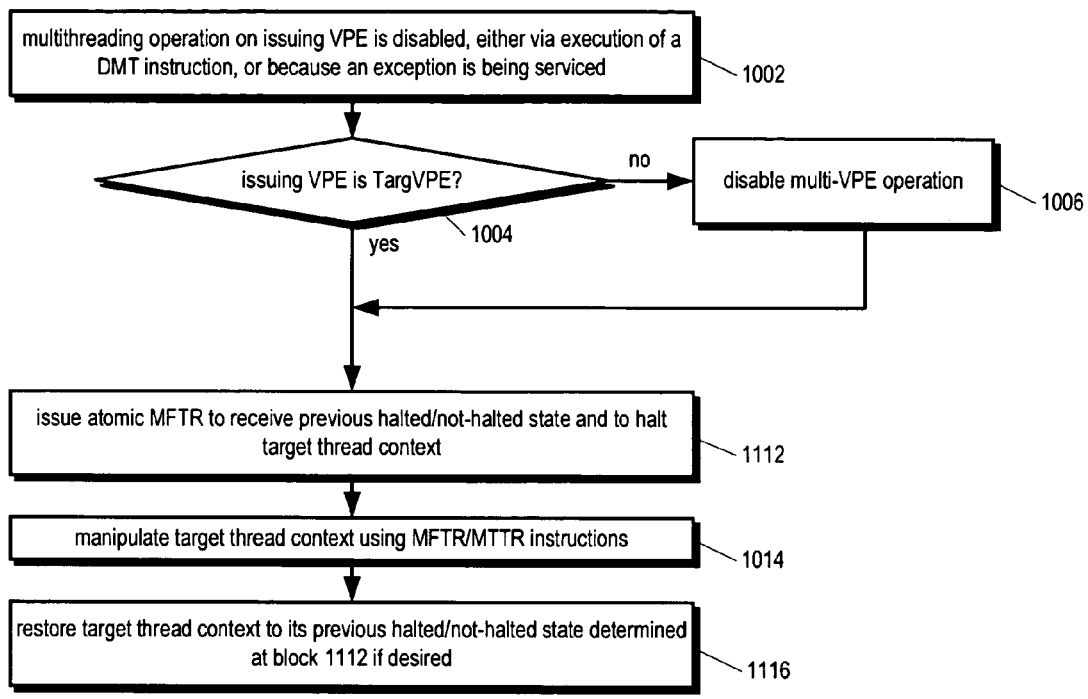
FIG. 11 is a flowchart illustrating use of the MFTR/MTTR instructions to manage thread contexts in the microprocessor of FIG. 1 according to an alternate embodiment.

Referring now to FIG. 11, a flowchart illustrating use of the MFTR/MTTR 300/400 instructions to manage thread contexts 104 in the microprocessor 100 of FIG. 1 according to an alternate embodiment is shown. The alternate embodiment illustrates use of an embodiment of the MFTR instruction 300 in which the MFTR instruction 300 performs an atomic read/update operation on the source register 324. FIG. 11 is similar to FIG. 10, and like-numbered blocks are the same; however, FIG. 11 does not include block 1008, 1012, or 1016. Instead, flow proceeds from block 1006 to block 1112; flow proceeds from block 1112 to block 1014; and flow proceeds from block 1014 to block 1116. Additionally, if it is determined at decision block 1004 that the VPE 102 the operating system wants to access is the same as the VPE 102 the operating system is executing on, then flow proceeds to block 1112.

At block 1112, the operating system loads one of the general purpose registers 224 of the issuing thread context 104 (in one embodiment, destination register 322) with a binary one value (corresponding to a set value of the H bit 599) and executes an MFTR instruction 300 with the TCHalt Register 509 of the target thread context 104 as the source register 324, i.e., the rd field 308 serves a dual purpose of specifying the destination register 322 of the issuing thread context 104 as both the register specifying the value to be written to the TCHalt Register 509 and the register to receive the previous contents of the TCHalt Register 509. The atomic MFTR 300 atomically reads the current value of the target thread context 104 TCHalt Register 509, writes the binary one value to the TCHalt Register 509 to halt the target thread context 104, and loads the current value just read (i.e., the previous halted/not-halted state) into the destination register 322.

At block 1116, depending upon the management performed by the operating system, the operating system selectively restores the target thread context 104 halted/not-halted state to its previous halted/not-halted state determined at block 1112. Flow ends at block 1116.

Figure 12:
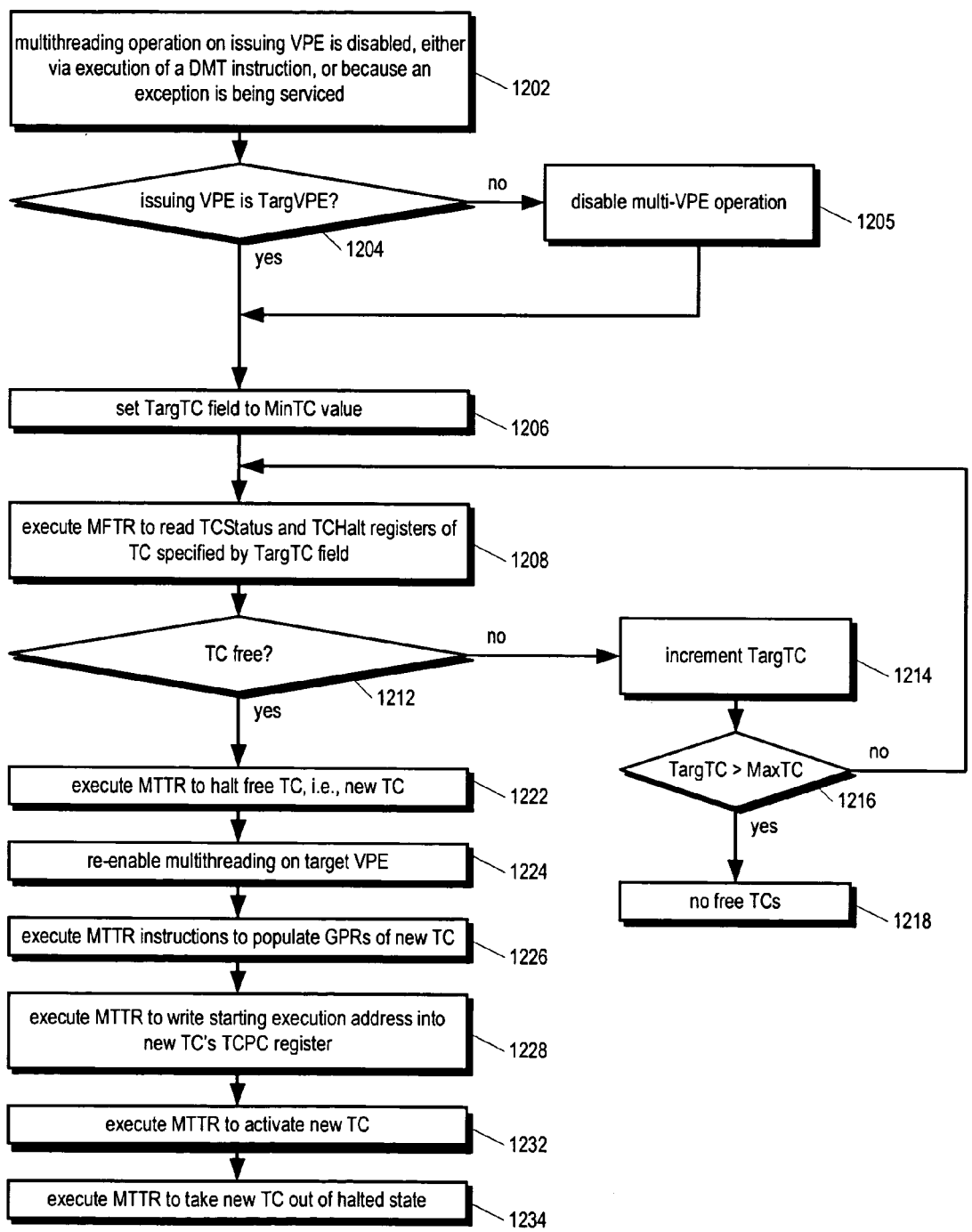
FIG. 12 is a flowchart illustrating explicit thread creation using MFTR/MTTR instructions according to the present invention.

Referring now to FIG. 12, a flowchart illustrating explicit thread creation, i.e., thread context 104 allocation and initialization, using MFTR/MTTR instructions 300/400 according to the present invention is shown. In one embodiment, the microprocessor 100 provides a FORK instruction for implicitly creating a new thread of execution, which may be performed by a user-level thread context 104. For a detailed description of the FORK instruction, the reader is referred to the above-referenced related U.S. Patent Application entitled APPARATUS, METHOD, AND INSTRUCTION FOR INITIATION OF CONCURRENT INSTRUCTION STREAMS IN A MULTITHREADING MICROPROCESSOR (Docket No. MIPS.0192-00US) filed concurrently herewith. However, FIG. 12 illustrates a method for creating a new thread without using the FORK instruction, but instead using MFTR/MTTR instructions 300/400. Flow begins at block 1202.

At block 1202, multithreading operation on the VPE 102 containing the thread context 104 executing the operating system thread that will manage one or more thread contexts 104, i.e., the issuing VPE 102, is disabled. The multithreading operation may be disabled because an exception was raised and is being serviced by the issuing VPE 102, or because a thread executing on the issuing VPE 102 executed a DMT (Disable MultiThreading) instruction, either of which clears the TE bit 543 in the VPEControl Register 504 of FIG. 5E of the VPE 102. Additionally, the operating system loads the TargVPE field 334 of the VPEControl Register 504 of FIG. 5E of the issuing VPE 102 with the value of the VPE 102 on which the new thread context 104 is to be allocated and initialized, referred to as the target VPE 102. In one embodiment, the operating system also executes a hazard barrier instruction to insure that all thread contexts 104 have quiesced. Flow proceeds to decision block 1204.

At decision block 1204, the operating system determines whether the VPE 102 it wants to access, i.e., the target VPE 102, which is specified in TargVPE 334, is the same as the VPE 102 the operating system is executing on, i.e., the issuing VPE 102. If so, flow proceeds to block 1206; otherwise, flow proceeds to block 1205.

At block 1205, the operating system disables multi-VPE 102 operation by executing a DVPE (Disable multi-VPE operation) instruction to clear the EVP bit 513 of the MVPControl Register 501 of FIG. 5B. The operating system disables multi-VPE 102 operation because, in one embodiment, access to a VPE 102 other than the VPE 102 issuing the MFTR/MTTR instruction 300/400 requires multi-VPE 102 operation to be disabled. Flow proceeds to block 1206.

At block 1206, the operating system loads the issuing TargTC field 332 of the VPEControl Register 504 with the value of minTC 554 of the VPEConf0 Register 505 of the issuing thread context 104. Flow proceeds to block 1208.

At decision block 1208, the operating system reads the A bit 588 of the TCSTatus Register 508 and the H bit 599 of the TCHalt Register 509 of the thread context 104 specified by the TargTC field 332 by executing two MFTR instructions 300. Flow proceeds to decision block 1212.

At decision block 1212, the operating system examines the A bit 588 and the H bit 599 to determine whether the target thread context 104 is free. If so, flow proceeds to block 1222; otherwise, flow proceeds to block 1214.

At block 1214, the operating system increments the TargTC value 332. Flow proceeds to decision block 1216.

At decision block 1216, the operating system determines whether the TargTC value is greater than the MaxTC value 555 of the VPEConf0 Register 505. If so, flow proceeds to block 1218; otherwise, flow returns to block 1208.

At block 1218, there are no free thread contexts 104 to allocate, and the operating system must take other measures to allocate a thread context 104, such as waiting for a program to de-allocate an active thread context 104. Flow ends at block 1218.

At block 1222, the operating system executes an MTTR instruction 400 to halt the newly found free thread context 104. Halting the new thread context 104 prevents other thread contexts 104 from allocating the new thread context 104. Flow proceeds to block 1224.

At block 1224, the operating system re-enables multi-threading on the target VPE 102, such as by executing a MTTR instruction 400 instruction to set the TE bit 543 of the VPEControl Register 504 of the target VPE 102. In one embodiment, the operating system executes an EMT instruction to re-enable multithreading operation on the target VPE 102. Flow proceeds to block 1226.

At block 1226, the operating system executes an MTTR instruction 400 to write the starting execution address of the new instruction stream into the new thread context 104 TCPC Register 594. Flow proceeds to block 1232.

At block 1232, the operating system executes an MTTR instruction 400 to activate the new thread context 104, i.e., to set the A bit 588 of the TCStatus Register 508. Flow proceeds to block 1234.

At block 1234, the operating system executes an MTTR instruction 400 to clear the H bit 599 of the new thread context 104 to take the new thread context 104 out of the halted state. Flow ends at block 1234.

Although the present invention and its objects, features, and advantages have been described in detail, other embodiments are encompassed by the invention. For example, although embodiments have been described in which the microprocessor is a register-based processor, other embodiments are contemplated in which the processor is a stack-based processor, such as a processor configured to efficiently execute Java virtual machine code. In such embodiments, the thread context of each of the two threads, rather than being stored in registers, may be stored in respective stack memories that are locally owned by the respective threads and not normally accessible by the other thread. Consequently, the source and destination operands of the MFTR/MTTR instructions may be specified in a local stack memory rather than in registers. For example, each thread context may include a stack pointer register, and the MFTR/MTTR instruction fields may specify an offset into the stack memory relative to the stack pointer register value, rather than specifying a register in the processor's register space. Generally, the MFTR/MTTR instructions transfer a value between two different thread contexts in a microprocessor, and the embodiments described may be adapted for other processor architectures to transfer the value between the two thread contexts.

In addition to implementations of the invention using hardware, the invention can be embodied in software (e.g., computer readable code, program code, instructions and/or data) disposed, for example, in a computer usable (e.g., readable) medium. Such software enables the function, fabrication, modeling, simulation, description and/or testing of the apparatus and method described herein. For example, this can be accomplished through the use of general programming languages (e.g., C, C++, JAVA, etc.), GDSII databases, hardware description languages (HDL) including Verilog HDL, VHDL, and so on, or other available programs, databases, and/or circuit (i.e., schematic) capture tools. Such software can be disposed in any known computer usable (e.g., readable) medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets. It is understood that the invention can be embodied in software (e.g., in HDL as part of a semiconductor intellectual property core, such as a microprocessor core, or as a system-level design, such as a System on Chip or SOC) and transformed to hardware as part of the production of integrated circuits. Also, the invention may be embodied as a combination of hardware and software.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. An instruction stored in a computer readable storage medium for execution on a multithreading microprocessor having a plurality of thread contexts, wherein the instruction is in an instruction stream issuing from a first of the plurality of thread contexts, the instruction comprising:
   a first operand, for specifying a second of the plurality of thread contexts, wherein said second of the plurality of thread contexts is distinct from the first of the plurality of thread contexts;
   a second operand, for specifying one of a plurality of registers in a source thread context;
   a third operand, for specifying one of a plurality of registers in a destination thread context; and
   an opcode, for instructing the microprocessor to move a value from said register of said source thread context specified by said second operand to said register of said destination thread context specified by said third operand, wherein one of said source and destination thread contexts is said second of the plurality of thread contexts, wherein the other of said source and destination thread contexts is the first of the plurality of thread contexts;
   wherein said plurality of registers of each of the plurality of thread contexts comprises a program counter register and a general purpose register set.

2. The instruction of claim 1, wherein said source thread context is said second of the plurality of thread contexts specified by said operand, and said destination thread context is the first of the plurality of thread contexts issuing the instruction stream including the instruction.

3. The instruction of claim 1, wherein said destination thread context is said second of the plurality of thread contexts specified by said operand, and said source thread context is the first of the plurality of thread contexts issuing the instruction stream including the instruction.

4. The instruction of claim 1, wherein said operand is stored in a register of the microprocessor.

5. The instruction of claim 4, wherein said operand is loaded into said register of the microprocessor by an instruction executing prior to the instruction for instructing the microprocessor to move said value from said source thread context to said destination thread context.

6. The instruction of claim 1, wherein said operand is specified in at least one field of the instruction.

7. The instruction of claim 1, wherein said second operand is specified in at least one field of the instruction.

8. The instruction of claim 1, wherein said second operand is specified in at least one field of the instruction.

9. The instruction of claim 1, wherein said program counter specifies a memory address for fetching a next instruction of an instruction stream issuing from said thread context.

10. The instruction of claim 1, wherein a set of general purpose registers store execution results of an instruction stream issuing from said thread context.

11. The instruction of claim 1, wherein each of the plurality of thread contexts comprises a stack pointer.

12. The instruction of claim 11, wherein each of the plurality of thread contexts further comprises a stack memory specified by said stack pointer.

13. The instruction of claim 12, wherein the instruction further comprises:
   a second operand, for specifying an offset relative to said stack pointer for specifying a location of said value in said stack memory.

14. The instruction of claim 1, wherein each of the plurality of thread contexts comprises a storage element for storing at least one control bit for controlling whether the microprocessor is halted from fetching instructions of an instruction stream issuing from said thread context.

15. The instruction of claim 14, wherein the first of the plurality of thread contexts moves a first predetermined value to said at least one control bit of said second of the plurality of thread contexts to cause the microprocessor to halt fetching of said instruction stream.

16. The instruction of claim 15, wherein the first of the plurality of thread contexts moves a second predetermined value to said at least one control bit of said second of the plurality of thread contexts to cause the microprocessor to start fetching of said instruction stream.

17. The instruction of claim 1, wherein each of the plurality of thread contexts comprises a storage element for storing an execution privilege level of said thread context.

18. The instruction of claim 17, wherein the microprocessor raises an exception to the instruction if said execution privilege level of the first of the plurality of thread contexts is not at least a predetermined execution privileged level.

19. The instruction of claim 18, wherein said predetermined execution privileged level comprises a kernel privilege level.

20. The instruction of claim 1, wherein each of the plurality of thread contexts comprises a storage element for storing information for uniquely identifying said thread context among the plurality of storage elements.

21. The instruction of claim 1, wherein each of the plurality of thread contexts comprises a storage element for storing at least one control bit for controlling whether said thread context is dynamically allocatable by a scheduler of the microprocessor.

22. The instruction of claim 1, wherein each of the plurality of thread contexts comprises a plurality of registers for storing multiplication results, wherein the instruction further comprises:
a second operand, for specifying one of said plurality of registers for storing multiplication results in said second of the plurality of thread contexts.

23. The instruction of claim 1, wherein said opcode instructs the microprocessor to move said value from said source thread context to said destination thread context independent of cooperation by said second of the plurality of thread contexts.

24. The instruction of claim 1, wherein said source and destination thread contexts are in distinct virtual processing elements of the microprocessor.

25. The instruction of claim 24, wherein the instruction further comprises:
a second operand, for specifying one of the virtual processing elements comprising said second of the plurality of thread contexts.

26. The instruction of claim 1, wherein each of the plurality of thread contexts comprises a storage element for storing a control value for controlling scheduling of instruction issuing bandwidth of the microprocessor allocated to said thread context.

27. An instruction stored in a computer readable storage medium for execution on a multithreading microprocessor having a plurality of virtual processing elements and a plurality of thread contexts within each of said plurality of virtual processing elements, the instruction comprising:
a first operand, for specifying one of the plurality of virtual processing elements;
a second operand, for specifying one of the plurality of thread contexts of said one of the virtual processing elements;
a third operand, for specifying one of a plurality of registers of a first thread context;
a fourth operand, for specifying one of a plurality of registers of a second thread context; and
an opcode, for instructing the microprocessor to move a value from the register of said first thread context specified by said third operand to the register of said second thread context specified by said fourth operand, wherein one of said first and second thread contexts is one of the plurality of thread contexts of one of the plurality of virtual processing elements specified by said first and second operands, wherein the other of said first and second thread contexts is one of the plurality of thread contexts of one of the plurality of virtual processing elements associated with an instruction stream including the instruction, wherein said first and second thread contexts are distinct;
wherein said plurality of registers of each of said first and second thread contexts comprises a program counter register and a general purpose register set.

28. The instruction of claim 27, wherein each of the plurality of virtual processing elements comprises an exception domain having context for servicing an exception raised on said virtual processing element.

29. The instruction of claim 27, wherein said first and second thread contexts are bound to distinct ones of said plurality of virtual processing elements.

30. A hardware multithreading microprocessor, comprising:
a plurality of thread contexts, each comprising a program counter and a general purpose register set;
an instruction decoder, coupled to said plurality of thread contexts, for decoding an instruction issuing from a first of the plurality of thread contexts, said instruction employing a first operand for specifying a second of the plurality of thread contexts, wherein said second of the plurality of thread contexts is distinct from said first of the plurality of thread contexts, said instruction including an opcode for instructing the microprocessor to move a value from a source thread context to a destination thread context, wherein one of said source and destination thread contexts is said second of the plurality of thread contexts, wherein the other of said source and destination thread contexts is said first of the plurality of thread contexts, wherein said instruction also include a second operand for specifying a register in the source thread context and a third operand for specifying a register in the destination thread context; and
selection logic, coupled to said plurality of thread contexts, for moving said value from said register in said source thread context specified by said second operand to said register in said destination thread context specified by said third operand, in response to said instruction decoder decoding said instruction.

31. The microprocessor of claim 30, wherein said selection logic comprises logic for selecting one of a plurality of registers comprised in said source thread context to provide said value, wherein said selection logic comprises logic for selecting one of a plurality of registers comprised in said destination thread context to receive said value.

32. The microprocessor of claim 30, further comprising:
a plurality of virtual processing element contexts, coupled to said selection logic, each comprising an exclusive set of said plurality of thread contexts and additional context, wherein said instruction also employs a fifih operand for specifying one of said plurality of virtual processing element contexts for use by said selection logic to select said second of the plurality of thread contexts.

33. The microprocessor of claim 32, wherein said additional context comprises a storage element for storing a control value for controlling whether multithreaded operation is enabled on said virtual processing element.

34. The microprocessor of claim 32, wherein said additional context comprises a storage element for storing a status value for indicating an exception type raised on said virtual processing element.

35. The microprocessor of claim 32, wherein said additional context comprises a storage element for storing said second operand.

36. The microprocessor of claim 32, further comprising:
a scheduler, coupled to said plurality of thread contexts, for scheduling fetching and issuing instructions on the microprocessor among said plurality of thread contexts;
wherein said additional context comprises a storage element for storing a control value for provision to said scheduler for controlling scheduling of said exclusive set of said plurality of thread contexts for fetching and issuing instructions on the microprocessor.

37. The microprocessor of claim 30, wherein each of said plurality of thread contexts comprises a stack pointer specifying a stack memory, wherein the microprocessor moves the value from said stack memory specified by said source thread context stack pointer to said stack memory specified by said destination thread context stack pointer.

38. A method for a first thread of execution having a first thread context to modify a second thread context associated with a second thread of execution in a multithreaded microprocessor without cooperation from the second thread of execution, the method comprising:
issuing an instruction whose location is specified by a program counter of the first thread context;
wherein each of the first and second thread contexts comprises a program counter register and a general purpose register set;
wherein said instruction includes a first operand that specifies one of the registers of the first thread context and a second operand that specifies one of the registers in the second thread context; and
copying a value from the register of the first thread context specified by the first operand to the register of the second thread context specified by the second operand, in response to said issuing.

39. The method of claim 38, further comprising:
determining whether the first thread context has a kernel privilege level; and
raising an exception, if the first thread context does not have the kernel privilege level.

40. The method of claim 39, wherein said copying is performed only if the first thread context has the kernel privilege level.

41. The method of claim 38, further comprising:
loading an operand into a register of the first thread context, prior to said issuing the instruction; and
selecting the second thread context from among a plurality of thread contexts of the microprocessor, in response to the operand, prior to said copying.

42. The method of claim 38, wherein said copying the value comprises writing a predetermined value into the second thread context to cause the microprocessor to halt issuing instructions from the second thread of execution.

43. The method of claim 38, wherein said copying the value comprises writing one or more values into general purpose registers of the second thread context.

44. The method of claim 38, wherein said copying the value comprises writing a starting execution address into a program counter of the second thread context.

45. The method of claim 38, wherein said copying the value comprises writing a predetermined value into the second thread context to cause the microprocessor to commence issuing instructions from the second thread of execution.

46. A method for a first thread of execution having a first thread context to examine a second thread context associated with a second thread of execution in a multithreaded microprocessor without cooperation from the second thread of execution, the method comprising:
issuing an instruction whose location is specified by a program counter of the first thread context;
wherein each of the first and second thread contexts comprises a program counter register and a general purpose register set;
wherein said instruction includes a first operand that specifies one of the registers of the first thread context and a second operand that specifies one of the registers in the second thread context; and
copying a value from the register of the second thread context specified by the second operand to the register of the first thread context specified by the first operand, in response to said issuing.

47. The method of claim 46, further comprising:
determining whether the second thread context is halted from fetching and issuing instructions, prior to said issuing; and
said issuing only if the second thread context is halted.

48. The method of claim 46, further comprising:
determining whether the second thread context is free for allocation by a new thread of execution by examining the value, in response to said copying.

49. The method of claim 46, wherein the microprocessor includes a plurality of virtual processing elements each comprising one or more thread contexts, the method further comprising:
determining, based on an operand of the instruction, which of the plurality of virtual processing elements comprises the second thread context, prior to said copying.

50. The method of claim 46, wherein each of the first and second thread contexts comprise a stack pointer, wherein at least a portion of the first and second thread contexts are located in a stack memory specified by the stack pointer of the first and second thread contexts, respectively.

51. The method of claim 46, further comprising:
storing an update value into the second thread context to update the copied value in the second thread, after said copying.

52. The method of claim 51, wherein said storing and copying are performed atomically.

53. A multithreading processing system, comprising:
a hardware microprocessor, having a plurality of thread contexts for storing state information associated with a corresponding plurality of instruction streams, configured to concurrently execute said plurality of instruction streams based on said plurality of thread contexts; and
a memory, coupled to said microprocessor, configured to store an instruction of a first of said plurality of instruction streams, said instruction specifying a first register of a first of said plurality of thread contexts associated with said first of said plurality of instruction streams, said instruction also specifying a second register of a second of said plurality of thread contexts, wherein said first and second of said plurality of thread contexts are distinct;
wherein said microprocessor is configured to copy a contents of said first register to said second register, in response to said instruction.

54. A computer program product for use with a computing device, the computer program product comprising:
a computer usable medium, having computer readable program code embodied in said medium, for causing a hardware multithreading microprocessor, said computer readable program code comprising:

first program code for providing a plurality of thread contexts, each comprising a program counter and a general purpose register set;

second program code for providing an instruction decoder, coupled to said plurality of thread contexts, for decoding an instruction issuing from a first of the plurality of thread contexts, said instruction employing an operand for specifying a second of the plurality of thread contexts, wherein said second of the plurality of thread contexts is distinct from said first of the plurality of thread contexts, said instruction including an opcode for instructing the microprocessor to move a value from a source thread context to a destination thread context, wherein one of said source and destination thread contexts is said second of the plurality of thread contexts, wherein the other of said source and destination thread contexts is said first of the plurality of thread contexts wherein said instruction also include a second operand for specifying a register in the source thread context and a third operand for specifying a register in the destination thread context; and third program code for providing selection logic, coupled to said plurality of thread contexts, for moving said value from said register in said source thread context specified by said second operand to said register in said destination thread context specified by said third operand, in response to said instruction decoder decoding said instruction.

55. The computer program product of claim 54, wherein said computer readable program code further comprises:

fourth program code for providing a plurality of virtual processing element contexts, coupled to said selection logic, each comprising an exclusive set of said plurality of thread contexts and additional context, wherein said instruction also employs a fourth operand for specifying one of said plurality of virtual processing element contexts for use by said selection logic to select said second of the plurality of thread contexts.

56. The computer program product of claim 55, wherein said computer readable program code further comprises:

fifth program code for providing a scheduler, coupled to said plurality of thread contexts, for scheduling fetching and issuing instructions on the microprocessor among said plurality of thread contexts, wherein said additional context comprises a storage element for storing a control value for provision to said scheduler for controlling scheduling of said exclusive set of said plurality of thread contexts for fetching and issuing instructions on the microprocessor.

57. The computer program product of claim 54, wherein said computer readable program code further comprises:

fourth program code for providing a stack pointer in each of said plurality of thread contexts for specifying a stack memory, wherein the microprocessor moves the value from said stack memory specified by said source thread context stack pointer to said stack memory specified by said destination thread context stack pointer.

* * * * *